(12) United States Patent
Jeon et al.

(10) Patent No.: US 11,036,381 B2
(45) Date of Patent: Jun. 15, 2021

(54) FLEXIBLE DEVICE AND OPERATION METHOD OF FLEXIBLE DEVICE

(71) Applicant: Samsung Electronics Co., Ltd., Suwon-si (KR)

(72) Inventors: Ha-Young Jeon, Seoul (KR); Sun-Young Yi, Seongnam-si (KR); Chae-Kyung Lee, Seoul (KR); Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/093,517

(22) PCT Filed: Apr. 12, 2017

(86) PCT No.: PCT/KR2017/003936
§ 371 (c)(1),
(2) Date: Oct. 12, 2018

(87) PCT Pub. No.: WO2017/179903
PCT Pub. Date: Oct. 19, 2017

(65) Prior Publication Data
US 2019/0212858 A1    Jul. 11, 2019

(30) Foreign Application Priority Data
Apr. 12, 2016   (KR) .................. 10-2016-0044861

(51) Int. Cl.
*G06F 3/0485*    (2013.01)
*G06F 1/16*    (2006.01)
(Continued)

(52) U.S. Cl.
CPC .......... *G06F 3/0485* (2013.01); *G06F 1/1652* (2013.01); *G06F 3/04815* (2013.01);
(Continued)

(58) Field of Classification Search
CPC .............. G06F 3/0414; G06F 3/04815; G06F 3/04883; G06F 3/0485; G06F 1/1652;
(Continued)

(56) References Cited

U.S. PATENT DOCUMENTS

2004/0008191 A1*  1/2004  Poupyrev ................ G06F 3/011
                                                              345/184
2010/0120470 A1   5/2010  Kim et al.
(Continued)

FOREIGN PATENT DOCUMENTS

JP      2008-152426 A    7/2008
KR   10-2015-0000632 A   1/2015
(Continued)

OTHER PUBLICATIONS

International Search Report dated Jul. 13, 2017 in connection with International Patent Application No. PCT/KR2017/003936.
(Continued)

*Primary Examiner* — Kent W Chang
*Assistant Examiner* — Andrew Lee

(57) ABSTRACT

A flexible device according to various embodiments of the present invention may comprise: a touch panel for detecting contact with respect to at least a part of the flexible device; and a processor for judging bending information of the flexible device, judging the properties of each of one or more contact areas detected by the touch panel, and controlling a function of the flexible device on the basis of the judged bending information and a change in the judged properties of the one or more contact areas. In addition to the various embodiments of the present invention, other embodiments may also be possible.

13 Claims, 19 Drawing Sheets

(51) Int. Cl.
*G06F 3/0488* (2013.01)
*G06F 3/0481* (2013.01)

(52) U.S. Cl.
CPC .. *G06F 3/04883* (2013.01); *G06F 2203/0381* (2013.01); *G06F 2203/04102* (2013.01); *G06F 2203/04806* (2013.01); *G06F 2203/04808* (2013.01)

(58) Field of Classification Search
CPC ... G06F 2203/0381; G06F 2203/04102; G06F 2203/04808; G06F 2203/04806
See application file for complete search history.

(56) References Cited

U.S. PATENT DOCUMENTS

| | | |
|---|---|---|
| 2010/0141605 A1 | 6/2010 | Kang et al. |
| 2011/0057873 A1 | 3/2011 | Geissler et al. |
| 2013/0154971 A1* | 6/2013 | Kang .................... G06F 3/0487 345/173 |
| 2013/0300686 A1 | 11/2013 | Yoon et al. |
| 2014/0035869 A1* | 2/2014 | Yun ....................... G06F 3/0414 345/174 |
| 2014/0055375 A1 | 2/2014 | Kim et al. |
| 2014/0176428 A1 | 6/2014 | Hsieh |
| 2014/0285618 A1 | 9/2014 | Cho et al. |
| 2014/0375574 A1 | 12/2014 | Kim et al. |
| 2014/0375587 A1 | 12/2014 | Yoo et al. |
| 2016/0070305 A1 | 3/2016 | Kim et al. |
| 2016/0147333 A1* | 5/2016 | Levesque .............. G06F 3/0414 345/161 |

FOREIGN PATENT DOCUMENTS

| | | |
|---|---|---|
| KR | 10-1517082 B1 | 4/2015 |
| KR | 10-2015-0093637 A | 8/2015 |
| KR | 10-2016-0029535 A | 3/2016 |
| KR | 10-2016-0031305 A | 3/2016 |

OTHER PUBLICATIONS

Written Opinion of the International Searching Authority dated Jul. 13, 2017 in connection with International Patent Application No. PCT/KR2017/003936.

Supplementary European Search Report dated Feb. 18, 2019 in connection with European Patent Application No. 17 78 2658, 25 pages.

* cited by examiner

FLEXIBLE DEVICE AND OPERATION METHOD OF FLEXIBLE DEVICE

CROSS-REFERENCE TO RELATED APPLICATIONS

This application is a 371 of International Application No. PCT/KR2017/003936 filed on Apr. 12, 2017, which claims priority to Korean Patent Application No. 10-2016-0044861 filed on Apr. 12, 2016 in the Korean Intellectual Property Office, the disclosures of which are herein incorporated by reference their entirety.

BACKGROUND

1. Field

Various embodiments of the present disclosure relate to a flexible device and a method for operating the same.

2. Description of Related Art

Generally, 'electronic devices' refer to devices that perform particular functions based on embedded programs, such as home appliances, electronic notes, portable multimedia players (PMPs), mobile communication terminals, tablet personal computers (PCs), video/audio devices, desktop/laptop computers, vehicle navigation systems, and so forth. For example, these electronic devices may output stored information in the form of sounds, images, and so forth. Due to the increased integration of electronic devices and the common use of ultra-high-speed, large-volume wireless communication, various functions have recently been provided through a single mobile communication terminal.

For example, entertainment functions such as games, multimedia functions such as music/video playback, communication and security functions for mobile banking, and functions such as schedule management, electronic wallets, or the like, as well as communication functions, have been integrated into a single electronic device.

As functions of electronic devices have become diversified, the designs of electronic devices have changed into various forms. In line with this, due to light and infrangible properties, flexible devices have attracted much attention. Flexible devices now lead the advent of a new user interface era which has been applied restrictively, or has not even been applicable, with existing glass substrate displays.

SUMMARY

According to existing technologies, a flexible device senses bending thereof and provides a preset function corresponding to the bending, but only a limited function is provided based on the simple determination of bending.

Various embodiments of the present disclosure provide a flexible device and a method for operating a flexible device in which, by reflecting a user's intention regarding bending the flexible device, various user interfaces may be provided.

Technical Solution

To solve the above-described or other problems, a flexible device, according to an embodiment of the present disclosure, may include a touch panel configured to sense contact with respect to at least a part of the flexible device and a processor configured to determine bending information of the flexible device, determine attributes of each of at least one contact region sensed through the touch panel, and control a function of the flexible device based on the determined bending information and the change of the attributes of the at least one contact region.

A method for operating a flexible device, according to any one of various embodiments of the present disclosure, may include determining bending information of the flexible device, sensing contact with respect to at least a part of the flexible device, determining attributes of each of at least one contact region corresponding to the sensed contact, and controlling a function of the flexible device based on the determined bending information and the change of attributes of the at least one contact region.

Advantageous Effects

A method for operating a flexible device, according to various embodiments, may implement various user interfaces reflecting a user's intentions by determining a change of attributes of a contact region touched by the user when the user bends or bends out the flexible device.

Moreover, bending the flexible device may not only provide a display effect and call or execute a function, but it may also provide various user interfaces capable of maximizing the use of content actually provided on the display.

For example, when two-dimensional (2D), three-dimensional (3D), 360-degree, virtual reality (VR), remote view contents, or the like are used in the flexible device, a easier and more optimized user interface may be provided compared to a conventional simple user interface.

DETAILED DESCRIPTION

Figure 1:
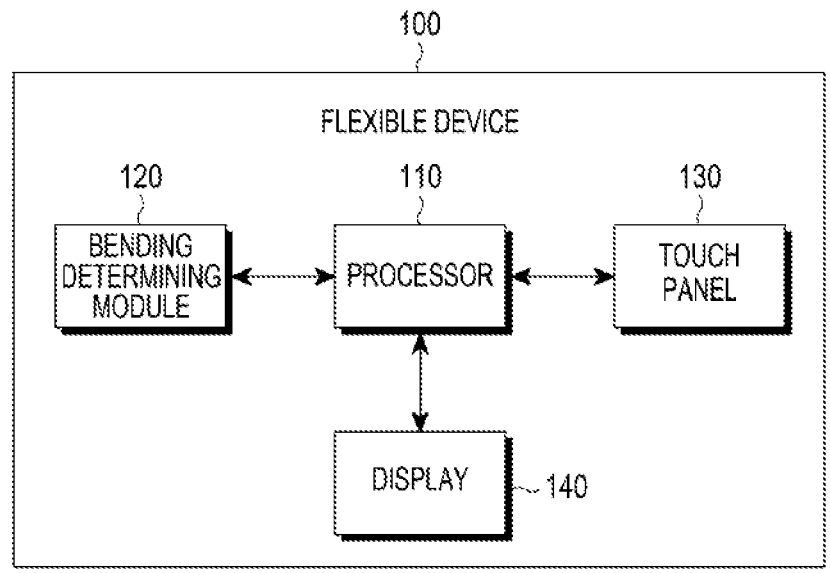
FIG. 1 illustrates an example of a structure of a flexible device according to an embodiment of the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (e.g., a first element) is "directly connected" or "directly coupled" to another element (e.g., a second element), it means that there is no intermediate element (e.g., a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a specific exemplary embodiment and may not have an intention to limit the scope of other exemplary embodiments. It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of a smartphone, a tablet personal computer (PC), a mobile phone, a video phone, an electronic book (e-book) reader, a desktop PC, a laptop PC, a netbook computer, a workstation server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, electronic tattoos, a smart mirror, or a smart watch).

According to some embodiments, the electronic device may be a smart home appliance. The home appliance may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MM), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to various embodiments of the present disclosure may be a flexible electronic device. The electronic device according to various embodiments of the present disclosure is not limited to the above-listed devices and may include new electronic devices according to technical development.

Various embodiments of the present disclosure disclose a flexible device and a method for operating a flexible device in which, by reflecting a user's intention regarding bending the flexible device, various user interfaces may be provided.

For example, when a flexible device is bent or bent out (or unbent), various functions of the flexible device may be controlled considering the change of attributes of each of at least one contact region sensed through a touch panel provided in the flexible device as well as bending information of the flexible device.

In various embodiments of the present disclosure described below, "bending information" may include at least one selected from among bending or non-bending, bending angle, bending position, bending direction, bending speed, bending duration, bending strength, or the number of bends, but various embodiments of the present disclosure are not limited thereto.

Moreover, in various embodiments of the present disclosure described below, "change of attributes of a contact region" may include at least one of a pressure change in the contact region, a form change in the contact region, an area change in the contact region, and a moving trajectory in the contact region, but various embodiments of the present disclosure are not limited thereto.

Furthermore, in various embodiments of the present disclosure described below, "bending interaction" means a bending or bending-out action that reflects a user's intention when the user holds the flexible device. For example, the bending interaction may include a user's bending action by applying force on the left hand, a user's bending action by applying force on the right hand, a user's bending action by applying force on both hands, a user's bending-out action to bend out a bent flexible device, and so forth, but various embodiments of the present disclosure are not limited thereto.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

FIG. 1 illustrates an example of a structure of a flexible device according to an embodiment of the present disclosure. Referring to FIG. 1, an electronic device (e.g., a flexible device 100) according to various embodiments of the present disclosure may include at least one of a processor 110, a bending determining module 120, a touch panel 130, or a display 140.

The electronic device may include the flexible device 100, and may also include a flexible display, a flexible printed circuit board (FPCB), a bending detecting sensor (e.g., a strain gauge, etc.), and so forth. According to various embodiments, when components of the flexible device are implemented in actual applications, two or more components thereof may be integrated into one component or one component may be divided into two or more components.

According to various embodiments, the flexible display may be implemented thin so as to be easily bent. Logic may also be added to flexible components in order to detect the shape of a body contacting the flexible components. For example, flexible sensors may be used with a flexible display coupled thereto. The flexible sensors may be based on, for example, resistance measurement, capacitance measurement, or impedance measurement, and may detect a bending force. Accelerometers may also be used to detect bending and/or movement. At least one sensor may be configured addressable to determine that the flexible device has been bent.

The processor 110 may include one or more of a central processing unit (CPU), an application processor (AP), and a communication processor (CP). The processor 110 may perform operations or data processing for control and/or communication with, for example, at least one of the other components of the electronic device (e.g., the flexible device 100).

The bending determining module 120 may determine the bending information of the flexible device 100. The bending information may be determined from information sensed by at least one bending detecting sensor. The bending detecting sensor may be implemented in various forms, and may include, for example, at least one strain gauge.

According to various embodiments of the present disclosure, bending information determined by the bending determining module 120 may include at least one selected from among bending or non-bending, bending angle, bending position, bending direction, bending speed, bending duration, bending strength, or the number of bends, but various embodiments of the present disclosure are not limited thereto. At least some functions of the bending determining module 120 may be included in the processor 110.

The touch panel 130 may determine a user's touch input. When the flexible device 100 is implemented thin so as to be easily bent, the touch panel 130 may be configured on the front surface or the rear surface of the flexible device 100 or both. The touch panel 130 may be configured on at least a part of the front surface of the flexible device 100 or at least a part of the rear surface of the flexible device 100. The touch panel 130 may be configured, together with the display 140 (e.g., a display panel), in the form of a module to form a touch screen. For example, according to various embodiments of the present disclosure, both the front surface and the rear surface of the flexible device 100 may be configured with touch screens, or one of them may be configured with a touch screen having the display 140 formed therein and the other may be configured with a touch pad.

According to various embodiments of the present disclosure, the touch panel 130 may sense contact with at least a part of the flexible device 100. The processor 110 may determine the attributes of each of at least one contact region on the flexible device 100 from information sensed by the touch panel 130. The processor 110 may determine the change of attributes of the contact region by continuously having the information sensed by the touch panel 130 inputted thereto. According to various embodiments of the present disclosure, the change of the attributes of the contact region may include at least one of a pressure change in the contact region, a form change in the contact region, an area change in the contact region, and a moving trajectory in the contact region, but various embodiments of the present disclosure are not limited thereto.

According to various embodiments of the present disclosure, the processor 110 may control a function of the flexible device 100 based on the bending information determined by the bending determining module 120 and the determined change of the attributes of the contact region. For example, the processor 110 may display a screen by controlling the display 140 based on the determined bending information and the determined change of the attributes of the contact region.

In addition, according to various embodiments of the present disclosure, the processor 110 may determine the type of bending interaction based on the determined bending information of the flexible device 100 and control a function of the flexible device 110 at least based on the determined type of bending interaction. According to various embodiments of the present disclosure, the type of bending interaction may include at least one selected from among bending by pressure in one direction, bending by pressure in two directions, bending for a specific time and then release, maintaining a bending state, or returning to a bending-out state.

According to various embodiments of the present disclosure, the function of the flexible device 100 controlled by the processor 110 may include a function that is set in a currently executed application. For example, the application may include at least one selected from among a map application, a two-dimensional (2D) content play application, a 3D content play application, a 360-degree content play application, or a virtual reality (VR) application, and detailed embodiments thereof will be described later. According to various embodiments of the present disclosure, a function of the flexible device may include at least one selected from among a mode switch function, a zoom-in/zoom-out function, movement in one direction, a panning function, a rotation function, or a viewpoint switch function, but various embodiments of the present disclosure are not limited thereto.

In various embodiments of the present disclosure, each functional unit or module may mean a functional and structural combination of hardware for performing the technical spirit of various embodiments of the present disclosure and software for driving the hardware. For example, it may be easily construed by those of ordinary skill in the art that each functional unit or module may mean a logical unit of a predetermined code and a hardware resource for executing the predetermined code, and does not necessarily mean physically connected code or one type of hardware.

A flexible device according to any one of various embodiments of the present disclosure may include a touch panel configured to sense contact with respect to at least a part of the flexible device and a processor configured to determine bending information of the flexible device, determine attributes of each of at least one contact region sensed through the touch panel, and control a function of the flexible device based on the determined bending information and a change of the attributes of the at least one contact region.

According to various embodiments, the change of the attributes of the contact region may include at least one of a pressure change in the contact region, a form change in the contact region, an area change in the contact region, and a moving trajectory in the contact region.

According to various embodiments of the present disclosure, the flexible device may further include a display configured to display a screen by the control of the processor based on the determined bending information and the change of the attributes of the at least one contact region.

According to various embodiments of the present disclosure, the bending information may include at least one selected from among bending or non-bending, bending angle, bending position, bending direction, bending speed, bending duration, bending strength, or the number of bends.

According to various embodiments of the present disclosure, the flexible device may further include at least one bending detecting sensor configured to sense that the flexible device has been bent.

According to various embodiments of the present disclosure, the flexible device may determine the type of bending interaction based on the determined bending information of the flexible device and control a function of the flexible device at least based on the determined type of bending interaction.

According to various embodiments of the present disclosure, the type of bending interaction may include at least one selected from among bending by pressure in one direction, bending by pressure in two directions, bending for a specific time and then release, maintaining a bending state, or returning to a bending-out state.

According to various embodiments of the present disclosure, the function of the flexible device may include a function that is set in a currently executed application.

According to various embodiments of the present disclosure, the application may include at least one selected from among a map application, a 2D content play application, a 3D content play application, a 360-degree content play application, or a VR application.

According to various embodiments of the present disclosure, a function of the flexible device may include at least one selected from among a mode switch function, a zoom-in/zoom-out function, movement in one direction, a panning function, a rotation function, or a viewpoint switch function.

Figure 2:
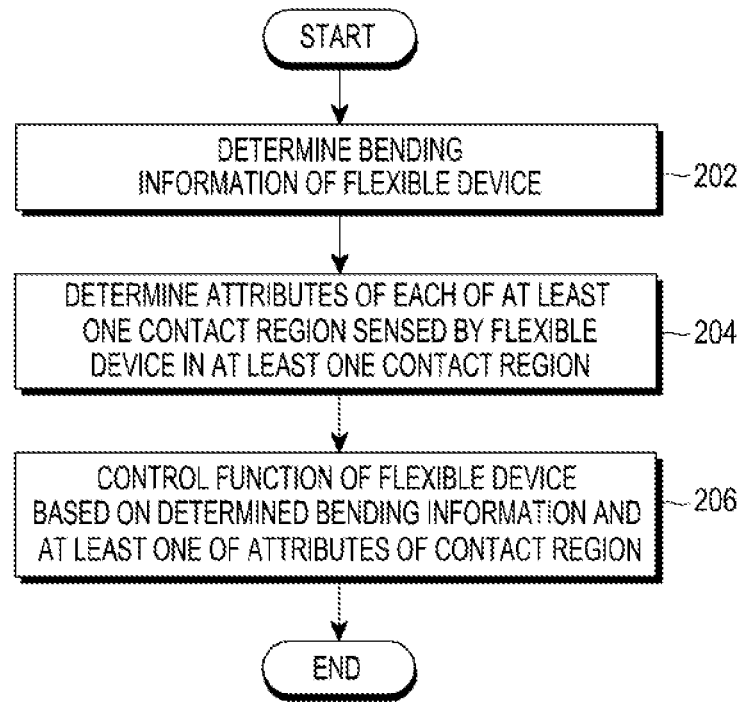
FIG. 2 is a flowchart illustrating an operation procedure of a flexible device according to various embodiments of the present disclosure.

FIG. 2 is a flowchart illustrating an operation procedure of a flexible device according to various embodiments of the present disclosure. Referring to FIG. 2, in operation 202, the flexible device may determine bending information of the flexible device.

According to various embodiments of the present disclosure, the bending information may include at least one selected from among bending or non-bending, bending angle, bending position, bending direction, bending speed, bending duration, bending strength, or the number of bends, but various embodiments of the present disclosure are not limited thereto.

In operation 204, the flexible device may determine attributes of each of at least one contact region sensed by the flexible device or change of the attributes of the contact region in the at least one contact region. According to various embodiments of the present disclosure, the change of the attributes of the contact region may include at least one of a pressure change in the contact region, a form change in the contact region, an area change in the contact region, and a moving trajectory in the contact region, but various embodiments of the present disclosure are not limited thereto.

In operation 206, the flexible device may control a function of the flexible device based on the determined bending information and a change in at least one of the attributes of the contact region.

According to various embodiments of the present disclosure, the flexible device may determine the type of bending interaction based on the determined bending information of the flexible device and control a function of the flexible device at least based on the determined type of bending interaction. According to various embodiments of the present disclosure, the type of bending interaction may include at least one selected from among bending by pressure in one direction, bending by pressure in two directions, bending for a specific time and then release, maintaining a bending state, or returning to a bending-out state.

According to various embodiments of the present disclosure, the function of the flexible device controlled based on the determined bending information and the change of the attributes of the contact region may include a function that is set in a currently executed application. For example, the application may include at least one selected from among a map application, a 2D content play application, a 3D content play application, a 360-degree content play application, or a VR application, and detailed embodiments thereof will be described later. According to various embodiments of the present disclosure, a function of the flexible device may include at least one selected from among a mode switch function, a zoom-in/zoom-out function, movement in one direction, a panning function, a rotation function, or a viewpoint switch function, but various embodiments of the present disclosure are not limited thereto.

At least one of the operations of FIG. 2 may be omitted and at least one other operation may be added between the operations of FIG. 4. In addition, the operations of FIG. 2 may be processed in an illustrated order, and an execution order of at least one operation may be exchanged with that of another operation. The operations illustrated in FIG. 2 may be performed in the electronic device or a server. At least one of the operations illustrated in FIG. 2 may be performed in the electronic device, and the other operations may be performed in the server.

A method for operating a flexible device, according to any one of various embodiments of the present disclosure, may include determining bending information of the flexible device, sensing contact with respect to at least a part of the flexible device, determining attributes of each of at least one contact region corresponding to the sensed contact, and controlling a function of the flexible device based on the determined bending information and a change of attributes of the at least one contact region.

According to various embodiments, the change of the attributes of the contact region may include at least one of a pressure change in the contact region, a form change in the contact region, an area change in the contact region, and a moving trajectory in the contact region.

According to various embodiments of the present disclosure, the method may further include controlling a screen based on the determined bending information and the change of the attributes of the at least one contact region.

According to various embodiments of the present disclosure, the bending information may include at least one selected from among bending or non-bending, bending angle, bending position, bending direction, bending speed, bending duration, bending strength, or the number of bends.

According to various embodiments of the present disclosure, the flexible device may sense that the flexible device has been bent by at least one bending detecting sensor.

According to various embodiments of the present disclosure, the method may further include determining the type of bending interaction based on the determined bending information of the flexible device and controlling a function of the flexible device at least based on the determined type of bending interaction.

According to various embodiments of the present disclosure, the type of bending interaction may include at least one selected from among bending by pressure in one direction, bending by pressure in two directions, bending for a specific time and then release, maintaining a bending state, or returning to a bending-out state.

According to various embodiments of the present disclosure, the function of the flexible device may include a function that is set in a currently executed application.

According to various embodiments of the present disclosure, the application may include at least one selected from among a map application, a 2D content play application, a 3D content play application, a 360-degree content play application, or a VR application.

According to various embodiments of the present disclosure, a function of the flexible device may include at least one selected from among a mode switch function, a zoom-in/zoom-out function, movement in one direction, a panning function, a rotation function, or a viewpoint switch function.

Figure 3:
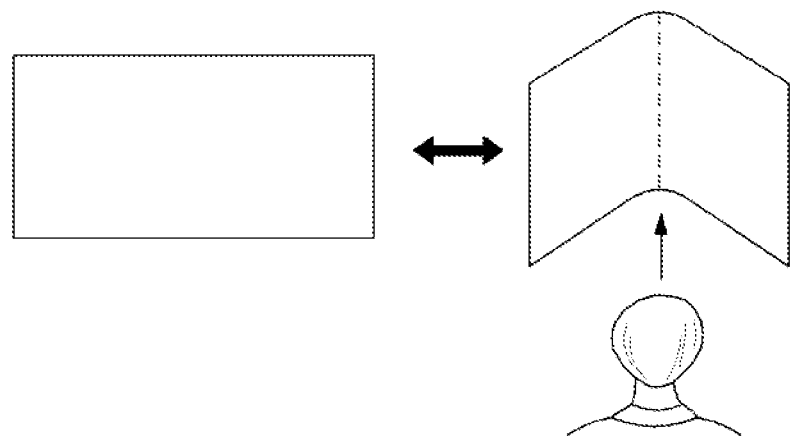
FIG. 3 illustrates bending of a flexible device according to various embodiments of the present disclosure.

FIG. 3 illustrates bending of a flexible device according to various embodiments of the present disclosure. Referring to FIG. 3, the flexible device according to various embodiments of the present disclosure may mean an electronic device that is bendable with respect to a position (e.g., a center). The flexible device according to various embodiments of the present disclosure may be bent forward with respect to a line of sight of a user.

According to various embodiments, the flexible device may also be bent backward with respect to the line of sight of the user. Although the flexible device is illustrated as being bendable once in FIG. 3, the flexible device may also be implemented as bendable twice or more times according to various embodiments of the present disclosure. Moreover, while the flexible device is illustrated as being bendable in any one direction in FIG. 3, even the same flexible device may be implemented to be bent in various positions or various directions.

Hereinafter, with reference to FIGS. 4A, 4B, 5A, 5B, 6A, and 6B, a description will be made of types of bending interaction according to various embodiments of the present disclosure. In the drawings to be referred to in the following description, a touched part may be illustrated as shaded for convenience, and among touched parts, a thickly-shaded part has applied thereto greater force (e.g., pressure) in a touch than in a lightly-shaded part.

Figures 4A, 4B:
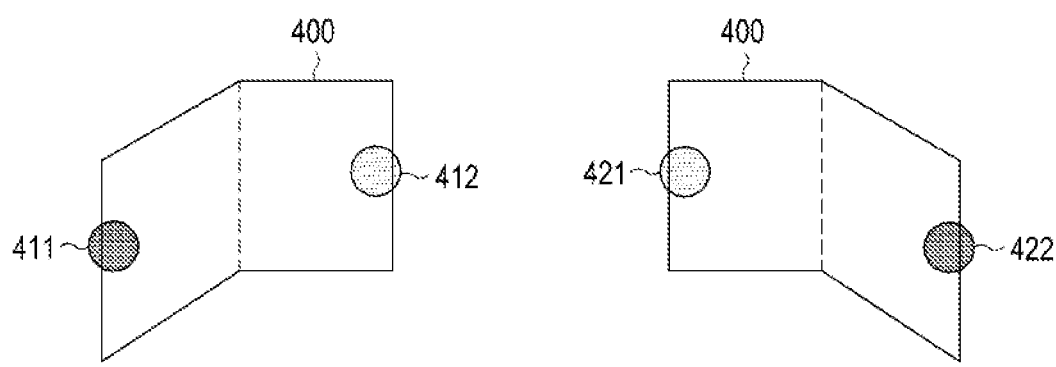
FIGS. 4A and 4B illustrate bending to the left or right by force exerted in one direction in a landscape mode according to various embodiments of the present disclosure.

FIGS. 4A and 4B illustrate bending to the left or right by force exerted in one direction in a landscape mode according to various embodiments of the present disclosure. FIGS. 4A and 4B show that the left and the right of the flexible device, with respect to a central line in a vertical direction, are bendable in the landscape mode.

It may be seen from FIG. 4A that when a user holds a flexible device 400 with both hands, the greater force is applied to a region 411 touched by the left hand than to a region 412 touched by the right hand. For example, when the user intends to bend the flexible device 400 by applying force on the left hand while holding the flexible device 400 with both hands, the flexible device 400 is bent as shown in FIG. 4A.

It may be seen from FIG. 4B that when the user holds the flexible device 400 with both hands, a greater force is applied to a region 422 touched by the right hand than to a region 421 touched by the left hand. For example, when the user intends to bend the flexible device 400 by applying force on the right hand while holding the flexible device 400 with both hands, the flexible device 400 is bent as shown in FIG. 4B.

According to various embodiments of the present disclosure, in FIGS. 4A and 4B, a user's intention may be determined to differ with the hand to which the user applies force for bending even if the bending angles are the same as each other or similar to each other. For example, it may be determined whether the user intends to apply force on the left hand or on the right hand for bending, and the determination result may be processed as different inputs.

Figure 5A:
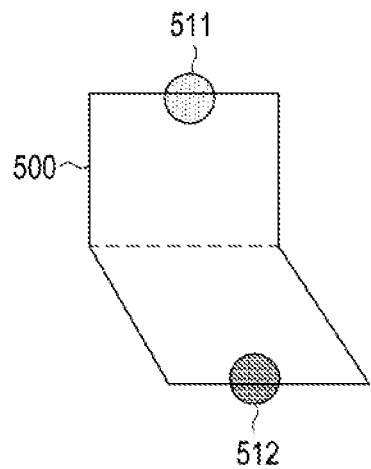
FIGS. 5A and 5B illustrate bending up or down by force exerted in one direction in a portrait mode according to various embodiments of the present disclosure.
Figure 5B:
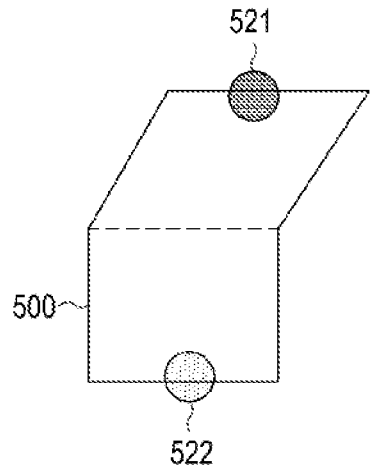

FIGS. 5A and 5B illustrate bending to the left or right by force exerted in one direction in the portrait mode according to various embodiments of the present disclosure. FIGS. 5A and 5B show that the upper part and the lower part of the flexible device, with respect to a central line in a horizontal direction, are bendable in the portrait mode.

It may be seen from FIG. 5A that when the user holds a flexible device 500 with both hands, the greater force is applied to a region 512 touched in the lower part than to a region 511 touched in the upper part. For example, when the user intends to bend the flexible device 500 by applying the greater force on the hand holding the lower part of the flexible device 500 while holding the flexible device 500 with both hands, the flexible device 500 is bent as shown in FIG. 5A.

It may be seen from FIG. 5B that when the user holds the flexible device 500 with both hands, the greater force is applied to a region 521 touched in the upper part than to a region 522 touched in the lower part. For example, when the user intends to bend the flexible device 500 by applying the greater force on the hand holding the upper part of the flexible device 500 while holding the flexible device 500 with both hands, the flexible device 500 is bent as shown in FIG. 5B.

Figure 6A:
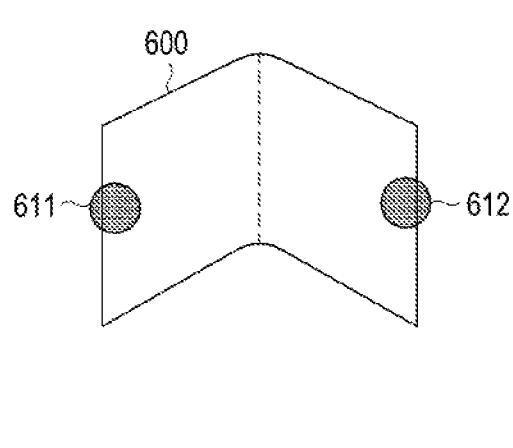
FIG. 6A illustrates bending to the left or right by force exerted in two directions according to various embodiments of the present disclosure.

FIG. 6A illustrates bending to the left or right by force exerted in two directions in the landscape mode according to various embodiments of the present disclosure. FIG. 6A shows that the left and the right of the flexible device, with respect to the central line in the vertical direction, are bendable in the landscape mode.

It may be seen from FIG. 6A that when a user holds a flexible device 600 with both hands, the same or similar force is applied to a region 611 touched by the left hand and a region 612 touched by the right hand. For example, when the user intends to bend the flexible device 500 by applying the same or similar force on both hands while holding the flexible device 600 with both hands, the flexible device 400 is bent as shown in FIG. 6A.

According to various embodiments of the present disclosure, as shown in FIGS. 4A, 4B, and 6A, even if the flexible device is bent at the same angle or similar angles, a user's intention for bending (for example, a hand on which the user applies the greater force) may be determined or identified and different operations may be performed based on the determination or identification.

Figure 6B:
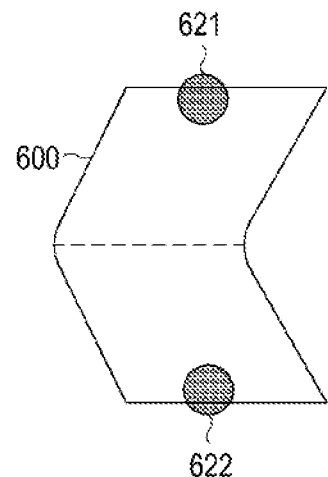
FIG. 6B illustrates bending up or down by force exerted in two directions according to various embodiments of the present disclosure.

FIG. 6B illustrates bending to the left or right by force exerted in two directions in the portrait mode according to various embodiments of the present disclosure. FIG. 6B show that the upper part and the lower part of the flexible device, with respect to the central line in the horizontal direction, are bendable in the landscape mode.

It may be seen from FIG. 6B that when the user holds a flexible device 600 with both hands, the same or similar force is applied to a region 621 touched in the upper part and to a region 622 touched by the lower part. For example, when the user intends to bend the flexible device 600 by applying the same or similar force on both hands while holding the flexible device 600 with both hands, the flexible device 400 is bent as shown in FIG. 6B.

According to various embodiments of the present disclosure, as shown in FIGS. 5A, 5B, and 6B, even if the flexible device is bent at the same angle or similar angles, a user's intention for bending (for example, a hand on which the user applies the greater force) may be determined or identified and different operations may be performed based on the determination or identification.

Figure 7:
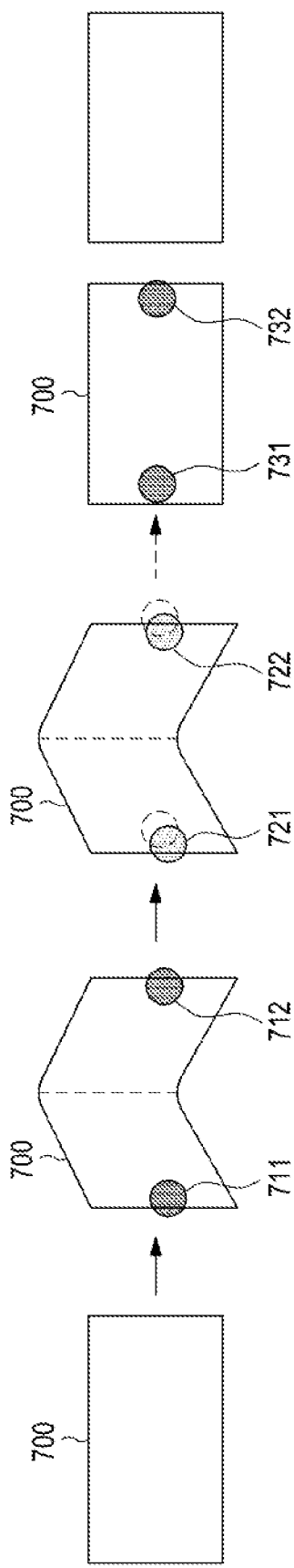
FIG. 7 illustrates temporary bending according to various embodiments of the present disclosure.

FIG. 7 illustrates temporary bending according to various embodiments of the present disclosure. Referring to FIG. 7, when a bent-out (flat) flexible device 700 is bent by applying force on both hands holding the flexible device 700, force applied to a contact region 711 touched by the left hand and force applied to a contact region 712 touched by the right hand may be determined, respectively.

The flexible device 700 may be bent by the force applied on both hands. When the user relaxes hands 721 and 722 on the flexible device 700 bent at a specific angle or removes the hands 721 and 722 from the flexible device 700, pressures applied to contact regions 731 and 732 may be lowered to a specific value or less or to 0.

According to various embodiments of the present disclosure, as shown in FIG. 7, when the user slightly bends and then releases the flexible device 700, an input or interaction by the bending may be stopped and a status of the screen may be maintained.

When the user bends out the bent flexible device 700 by applying force, the bending-out may be determined and a corresponding input or interaction may be used.

Figure 8:
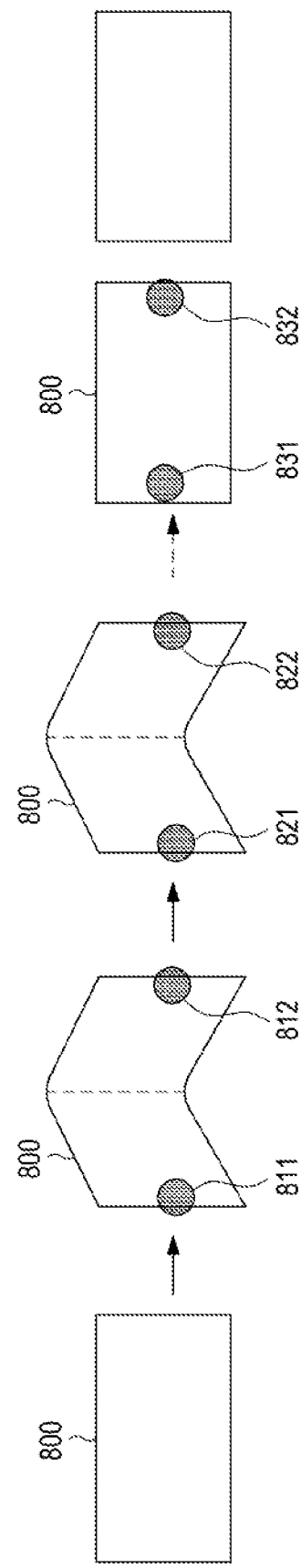
FIG. 8 illustrates a state in which bending is maintained according to various embodiments of the present disclosure.

FIG. 8 illustrates a state in which bending is maintained according to various embodiments of the present disclosure. Referring to FIG. 8, when a bent-out (flat) flexible device 800 is bent by applying force on both hands holding the flexible device 700, force applied to a contact region 811 touched by the left hand and force applied to a contact region 812 touched by the right hand may be determined, respectively.

The flexible device 800 may be bent by the force applied on both hands. When the flexible device 800 is bent at a specific angle, the user may continuously apply greater force than a specific value to the contact regions 811 and 812.

According to various embodiments of the present disclosure, as shown in FIG. 8, when the user continuously applies force to the slightly-bent flexible device 800, an input or interaction by the bending may be maintained.

When the user bends out the bent flexible device 800 by applying force in the opposite direction, the bending-out may be determined and a corresponding input or interaction may be used. For example, the latest state may be maintained, a function that is opposite to a function executed by the bending may be performed, or the function executed by the bending may be canceled.

Figure 9:
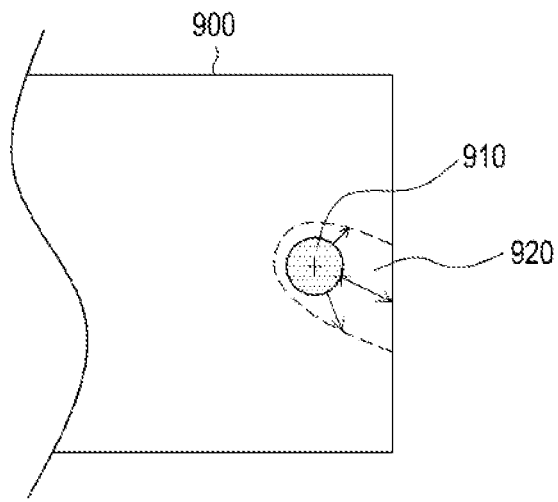
FIG. 9 illustrates change of a contact region according to various embodiments of the present disclosure.
Figure 10:
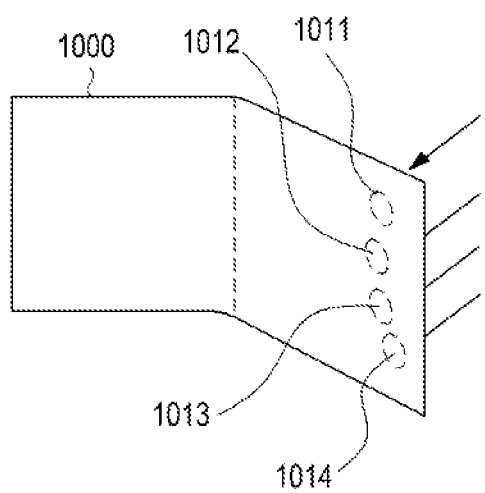
FIG. 10 illustrates a pressure applied to a rear surface according to various embodiments of the present disclosure.

With reference to FIGS. 9 and 10, a detailed description will be made of examples of a method for determining the bending direction based on a user's intention as bending interaction. For example, as shown in FIGS. 4A, 4B, 5A, 5B, 6A, and 6B, by determining or identifying whether the user intends to bend by applying force on the left hand, by applying force on the right hand, or by applying the same force on the both hands, various inputs or interactions may be provided. According to various embodiments of the present disclosure, determination of the bending direction based on the user's intention may be implemented in various ways, without being limited to embodiments described below.

According to various embodiments of the present disclosure, determination of the bending direction (determination of the bending direction, taking into account the user's intention for bending, for example, by applying force on the left hand, by applying force on the right hand, by applying the same force to both hands, by releasing the force after bending, by continuously applying force after bending, and so forth) may be performed based on attributes of a contact region touched by a hand when the user holds the flexible device, or change of the attributes of the contact region. According to various embodiments of the present disclosure, the change of the attributes of the contact region may include at least one of a pressure change in the contact region, a form change in the contact region, an area change in the contact region, and a moving trajectory in the contact region, but various embodiments of the present disclosure are not limited thereto.

In addition, according to various embodiments of the present disclosure, determination of the bending direction may be performed by at least one sensor. For example, assuming that the flexible device is bent with respect to a predetermined position, the determination may be performed based on a position change value (e.g., a rotation value, a moving speed, a moving distance, etc.) recognized by at least one sensor (e.g., a gyroscope, an accelerometer, or the like) provided in both sides or by any one of them with respect to a bending reference line, and may be performed based on coordinates value of a bent position obtained by a flex sensor or a piezo sensor.

According to various embodiments of the present disclosure, the bending direction may also be determined by measuring pressure applied to a contact face of the flexible device when the user holds the flexible device with both hands or either one of them, or by measuring pressure applied to the rear surface of the flexible device.

In addition, according to various embodiments of the present disclosure, the determination of the bending direction may be performed using a combination of at least one of the above-described various ways.

FIG. 9 illustrates change of a contact region according to various embodiments of the present disclosure. Referring to FIG. 9, determination of a bending direction reflecting a user's intention may be performed based on attributes of a contact region or change of the attributes of the contact region when the user contacts a flexible device 900. For example, a contact region 910 when the flexible device 900 is flat and a contact region 920 when the user bends the flexible device 900 may be different. According to various embodiments of the present disclosure, when the user bends or bends out the flexible device 900, a bending direction reflecting a user's intention may be determined based on at least one of change in pressures in the contact regions 910 and 920, change of the shapes of the contact regions 910 and 920, change of the areas of the contact regions 910 and 920, and moving trajectories of the contact regions 910 and 920.

FIG. 10 illustrates pressure applied to a rear surface according to various embodiments of the present disclosure. Referring to FIG. 10, according to various embodiments of the present disclosure, force or pressure applied to the rear surface of a flexible device 1000 may be measured to determine the bending direction reflecting a user's intention. For example, when the user bends the flexible device 1000 while holding the flexible device 1000 with the right hand, contact regions 1011, 1012, 1013, and 1014 touched by four fingers may be sensed on the rear surface of the flexible device 1000 as shown in FIG. 10.

According to various embodiments of the present disclosure, the bending direction reflecting a user's intention may be determined by determining attributes of a contact region or change of the attributes of the contact region, such as the number of contact regions sensed on the rear surface of the flexible device 1000, areas of the contact regions 1000, force applied to the contact regions 1000, or the like.

In FIG. 10, the rear surface of the flexible device 1000 may be implemented with a touch screen including a function of a display, or with a touch pad without a function of a display.

With reference to FIGS. 11A through 14, a detailed description will be made of a method for determining information such as bending degree, bending direction, bending state, or the like of the flexible device when the user bends or bends out the flexible device. According to various embodiments of the present disclosure, various operations or functions may be provided by determining or identifying the bending degree, the bending direction, the bending state, or the like of the flexible device when the user bends or bends out the flexible device.

Figure 11A:
FIGS. 11A through 11D illustrate identification of a bending degree according to various embodiments of the present disclosure.
Figure 11B:
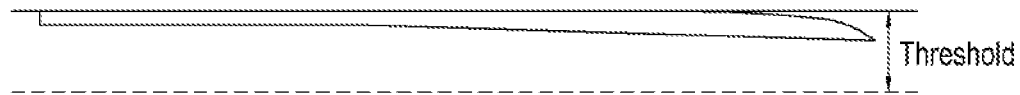
Figure 11C:
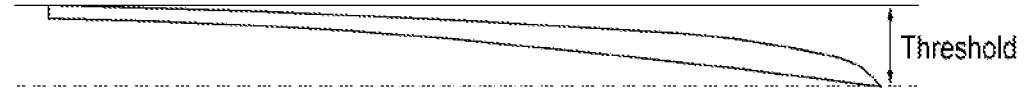
Figure 11D:
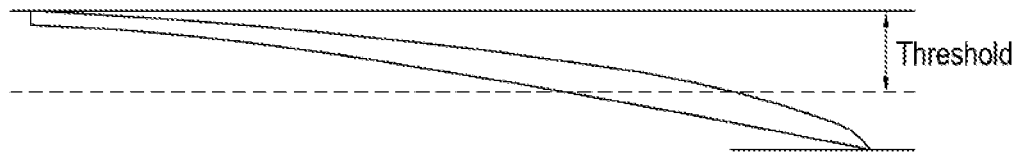

FIGS. 11A through 11D illustrate identification of a bending degree according to various embodiments of the present disclosure. Referring to FIGS. 11A through 11D, when a flexible device is bent, if a bending degree is greater than or equal to a preset threshold, the flexible device may be determined to be in a bending state. For example, in FIGS. 11A and 11B, since the bending degree is less than the threshold, the flexible device may not be determined to be in the bending state. According to various embodiments of the present disclosure, when the bending degree of the flexible device reaches the threshold as shown in FIG. 11C and then exceeds the threshold as shown in FIG. 11D, the flexible device may be determined to be in the bending state and may perform a corresponding operation.

According to various embodiments of the present disclosure, when the flexible device changes from a physically flat state to a bending state, if a preset condition is satisfied, the change may be processed. For example, when contact (holding) and bending continue for a preset time or longer, the flexible device may be determined to be in the bending state.

According to various embodiments of the present disclosure, when bending is terminated within preset N seconds, the bending may not be recognized as bending corresponding to a user's intention even if the flexible device maintains the bending state, and thus an additional operation may not be performed. For example, according to various embodiments of the present disclosure, when the user bends the flexible device, a corresponding operation may be performed if the force of a pressure greater than or equal to a preset pressure is applied and bending is performed at an angle greater than or equal to a preset angle (e.g., an angle greater than or equal to the angles shown in FIGS. 11C and 11D). If the force of the pressure greater than or equal to the preset pressure is not applied or bending is not performed at the angle greater than or equal to the preset angle, the flexible device may recognize the bending as a general touch input rather than as bending.

Figure 12:
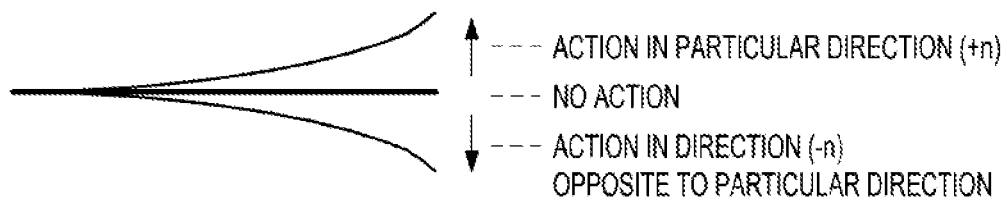
FIG. 12 illustrates identification of a bending direction according to various embodiments of the present disclosure.
Figure 13:
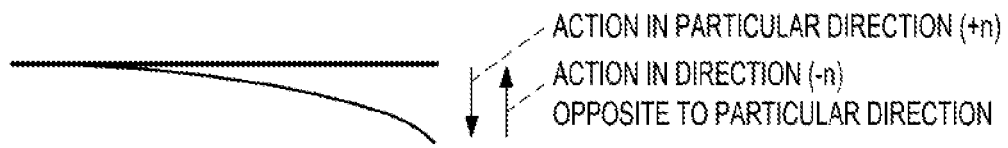
FIG. 13 illustrates identification of a bending direction according to various embodiments of the present disclosure.

FIG. 12 shows an example of a flexible device that is bendable forward and backward in the flat state, and FIG. 13 shows an example of a flexible device bendable only in one direction in the flat state.

FIG. 12 illustrates identification of a bending direction according to various embodiments of the present disclosure. Referring to FIG. 12, the flexible device may not perform an operation in the flat state and may perform a preset operation when being bent in one direction. According to various embodiments of the present disclosure, the flexible device may perform an operation corresponding to bending in the direction when being bent in a particular direction (a first direction), and the flexible device may perform an operation corresponding to bending in a direction opposite to the particular direction (a second direction) when being bent in the opposite direction.

FIG. 13 illustrates identification of a bending direction according to various embodiments of the present disclosure. Referring to FIG. 13, the flexible device may perform a preset operation in the flat state when being bent in any one direction by the user. According to various embodiments of the present disclosure, when the flexible device returns to the flat state from the bending state corresponding to the bending, the bending is determined as bending in the opposite direction and a function corresponding to the bending in the opposite direction may be performed.

Figure 14:
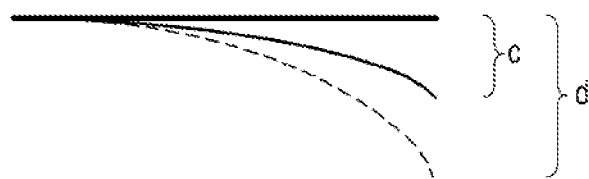
FIG. 14 illustrates identification of a bending strength according to various embodiments of the present disclosure.

FIG. 14 illustrates identification of a bending strength according to various embodiments of the present disclosure. Referring to FIG. 14, when the flexible device is bent according to various embodiments of the present disclosure, the flexible device may be controlled in different levels corresponding to the pressure of a force applied to the flexible device by the user or a bending angle of the flexible device. For example, as shown in FIG. 14, when the flexible device in the flat state is bent by force applied thereto, a case where the flexible device is bent by c and a case where the flexible device is bent by d may be processed differently. According to various embodiments of the present disclosure, control corresponding to bending may be faster, deeper, stronger, or greater in d than c. For example, according to various embodiments of the present disclosure, the degree of control in navigation, movement, control, zoom, and so forth may be applied differently in proportion to the degree of bending.

Figure 15:
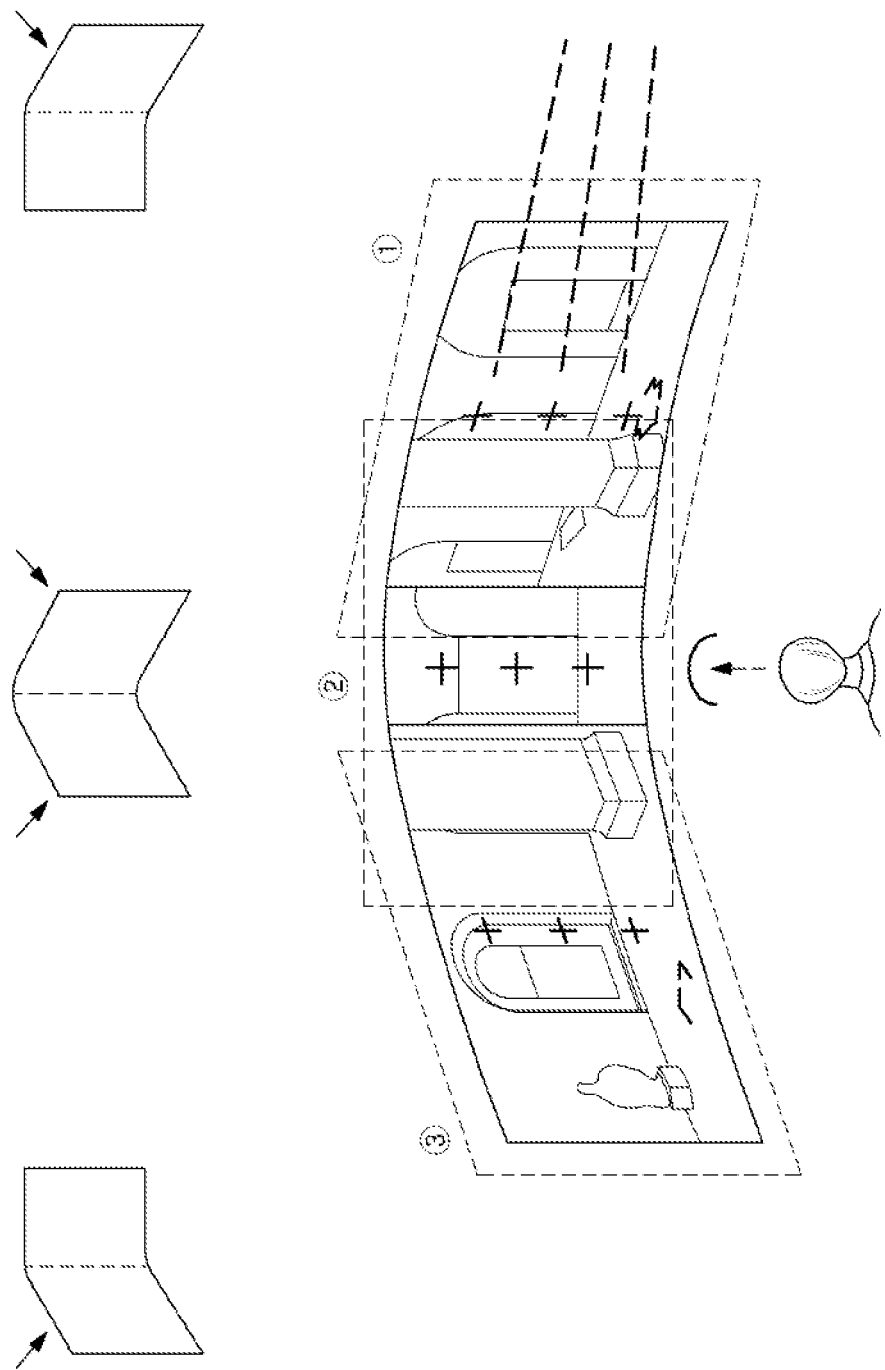
FIG. 15 illustrates an example of operation implementation in a flexible device according to various embodiments of the present disclosure.

FIG. 15 illustrates an example of operation implementation in a flexible device according to various embodiments of the present disclosure. Referring to FIG. 15, various operations corresponding to bending interaction may be performed.

As illustrated in FIG. 15, for a screen displayed on a display, an operation corresponding to bending interaction according to various embodiments of the present disclosure may be implemented. A reference point for content control or navigation may set the center of the screen displayed on the display by default, and the reference point may be provided as a visual cue on the screen.

Referring to FIG. 15, when the user holding the flexible device with both hands bends the flexible device by applying force on the left hand as shown in the left-upper side of FIG. 15, the displayed screen as indicated by (2) moves to the right and thus the screen as indicated by (1) may be displayed. When the user holding the flexible device with both hands bends the flexible device by applying force on the right hand as shown in the right-upper side of FIG. 15, the displayed screen as indicated by (2) moves to the right and thus the screen as indicated by (3) may be displayed.

According to various embodiments of the present disclosure, in case of flick down or touch and move down on the illustrated screen, the reference point displayed on the screen may move up. In case of flick up or touch and move up on the illustrated screen, the reference point displayed on the screen may move down.

Referring to FIGS. 16 to 24, a description will be made of examples of operations for respective contents applied according to various embodiments of the present disclosure.

Figure 16:
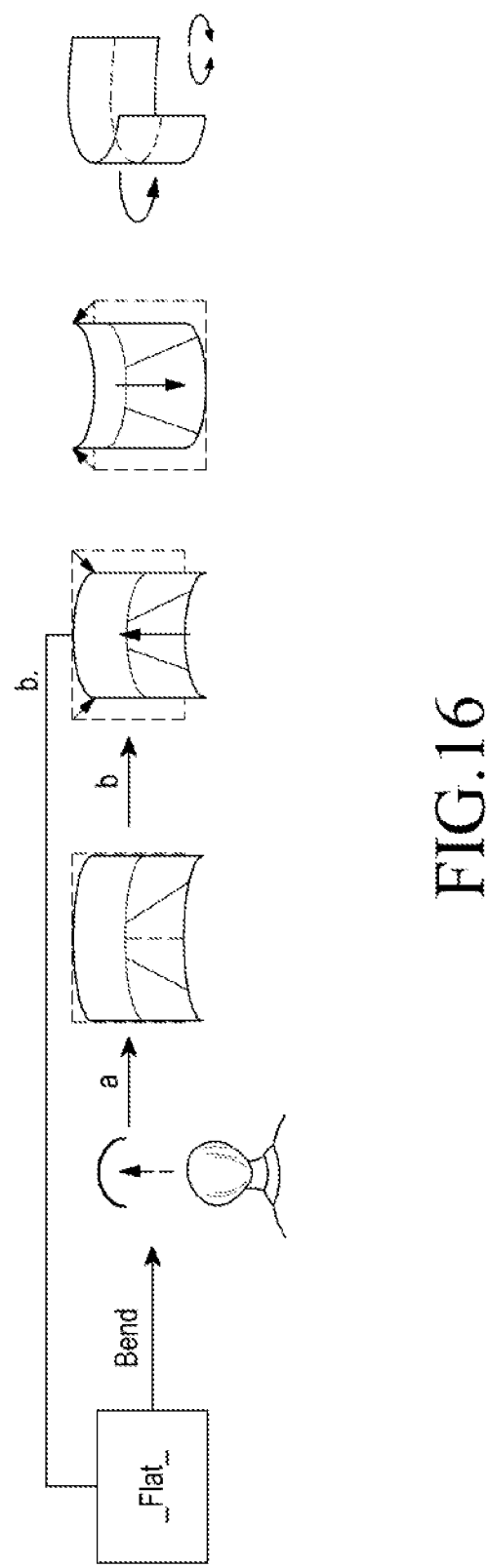
FIG. 16 illustrates an example of operation implementation applied to three-dimensional (3D) view in a flexible device according to various embodiments of the present disclosure.

FIG. 16 illustrates an example of operation implementation applied to 3D view in a flexible device according to various embodiments of the present disclosure. Referring to FIG. 16, when 2D content is displayed on the screen of the flexible device, if the user slightly bends and then releases the flexible device, a 2D mode may be changed to a 3D mode (step a), and if the user bends the flexible device again and holds the flexible device, then a preset control function may be performed (step b).

According to various embodiments of the present disclosure, if the flexible device is bent and then is held when 2D content is displayed on the screen of the flexible device, the 2D mode may be changed to the 3D mode and at the same time, a corresponding control function set in the 3D mode may be immediately performed (directly enter step b).

More specifically, referring to FIG. 16, when 2D content is displayed on the screen of the flexible device, if the user slightly bends and then releases the flexible device, the 2D mode may be changed to the 3D mode (step a). In the 3D mode changed from the 2D mode, when the user slightly bends and then releases the flexible device, the 3D mode may be changed to a street view.

When the user continuously bends forward the flexible device in the 3D mode, the screen may move in the moving direction, that is, forward, and the speed of movement in the moving direction may be increased in proportion to the bending degree. When the user continuously bends backward the flexible device in the 3D mode, the screen may move in the opposite direction and the speed of movement in the opposite direction may be increased in proportion to the bending degree.

According to various embodiments of the present disclosure, when the user bends the flexible device in the 3D mode by continuously applying force to the left side of the flexible device, then the viewpoint of the screen may rotate left; when the user bends the flexible device by continuously applying force to the right of the flexible device, then the viewpoint of the screen may rotate right. The speed of rotation may also be increased in proportion to the strength of the force applied to the left or the right or the bending degree.

Figure 17:
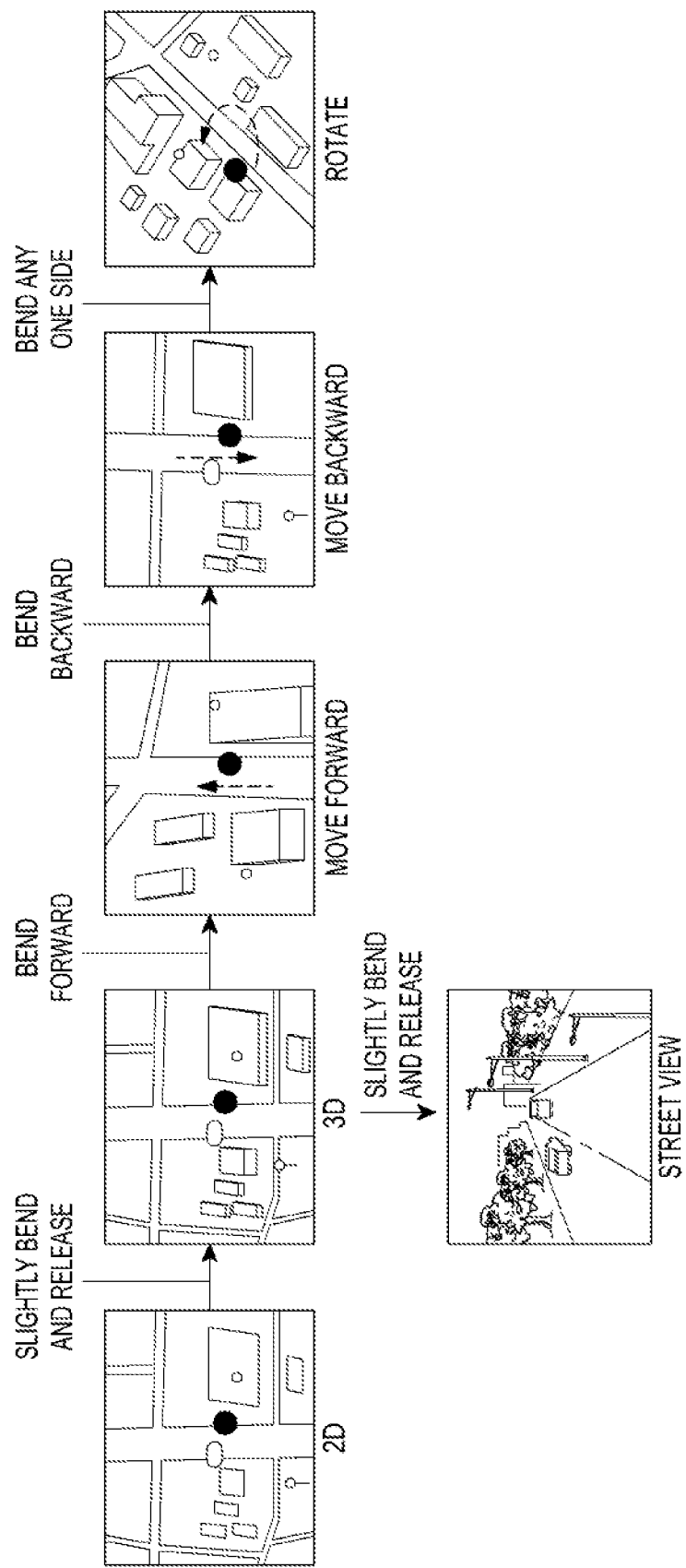
FIG. 17 illustrates an example of operation implementation applied to navigation in a flexible device according to various embodiments of the present disclosure.

FIG. 17 illustrates an example of operation implementation applied to a map application in a flexible device according to various embodiments of the present disclosure. Referring to FIG. 17, as described with reference to FIG. 16, various embodiments of the present disclosure may be applied to a map application where 2D content and 3D content may be provided together.

For example, when the map application is executed in the flexible device, a map may be displayed on a 2D view screen as shown in the leftmost side of FIG. 17. A current position may be displayed in the center of the map. According to various embodiments of the present disclosure, when the user holds, slightly bends, and then releases the flexible device on the 2D view screen (for example, bends the flexible device by a preset angle or more and then bends out the flexible device within a preset time), then the 2D view screen may be switched to a 3D view screen. When the user slightly bends and then releases the flexible device on the 3D view screen, then the 3D view screen may be switched to the street view. When the user slightly bends and then releases the flexible device on the street view screen, then the street view screen may be switched to the 2D view screen or the 3D view screen.

When the user bends the bent flexible device forward by continuously applying force to the bent flexible device after mode switch by bending the flexible device, the screen may move forward along the moving direction. When the user bends the bent flexible device backward by continuously applying force to the bent flexible device, the screen may move backward along the moving direction.

According to various embodiments of the present disclosure, when the user bends any one side of the flexible device (e.g., bends the flexible device by applying greater force on the right hand than on the left hand or on the left hand than on the right hand), the screen may rotate in a corresponding direction.

Figure 18:
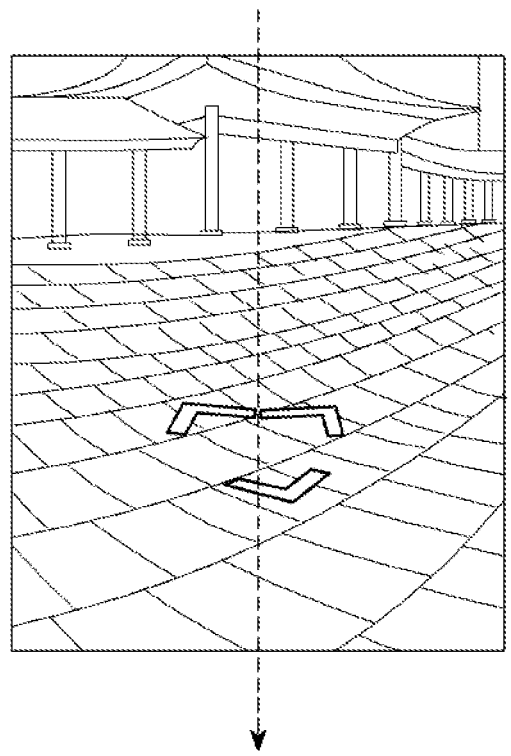
FIG. 18 illustrates a street view displayed on a flexible device according to various embodiments of the present disclosure.

FIG. 18 illustrates a street view displayed on a flexible device according to various embodiments of the present disclosure. After the map application is executed on the flexible device as shown in FIG. 17, the street view mode may be executed as shown in FIG. 18. According to various Referring to FIG. 19, in the landscape mode, when the flexible device is in the flat state, a street view may be displayed. According to various embodiments of the present disclosure, when the user holding the flexible device with both hands bends forward the flexible device by applying the greater force on the right hand, then the street view screen may rotate left. According to various embodiments of the present disclosure, when the user holding the flexible device with both hands bends forward the flexible device by applying the greater force on the left hand, then the street view screen may rotate right.

Figure 20:
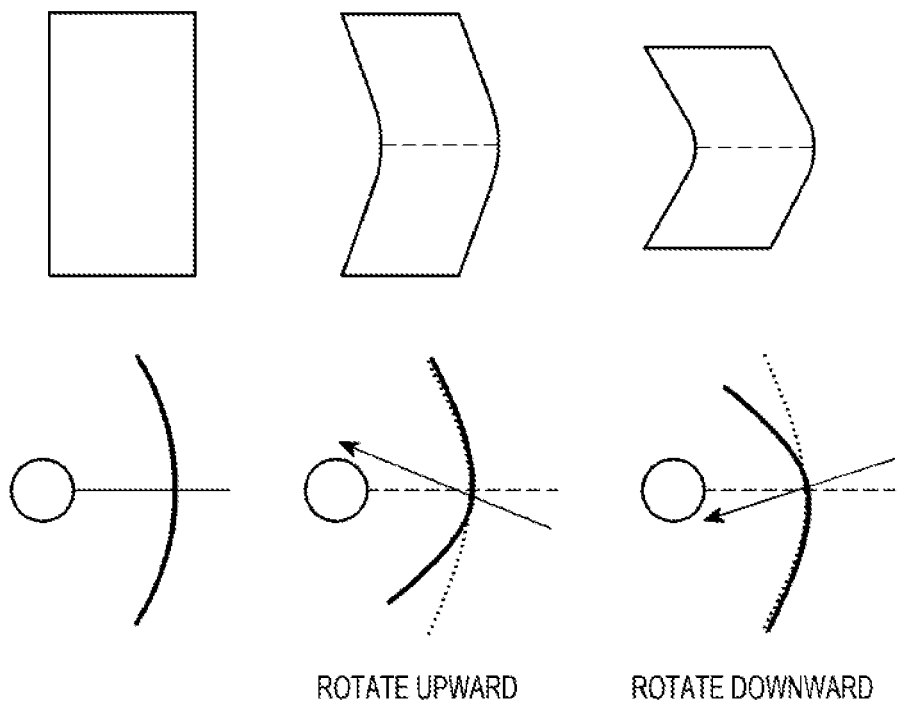

Referring to FIG. 20, in the portrait mode, when the flexible device is in the flat state, a street view may be displayed. According to various embodiments of the present disclosure, when the user holding the flexible device with both hands bends forward the flexible device by applying the greater force on the hand holding the lower part of the flexible device, then the street view screen may rotate upward. According to various embodiments of the present disclosure, when the user holding the flexible device with both hands bends forward the flexible device by applying the greater force on the hand holding the upper part of the flexible device, then the street view screen may rotate downward.

Figure 19:
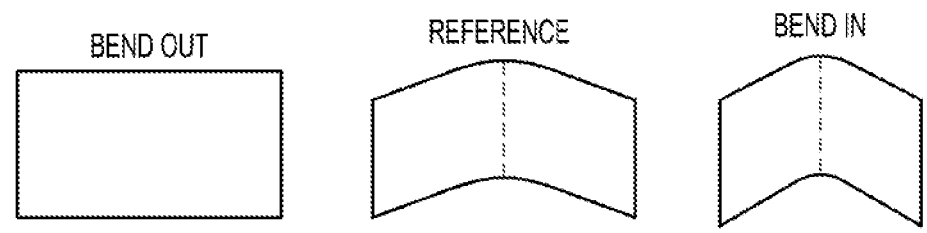
FIGS. 19 and 20 illustrate examples of operation implementation applied to street view in a flexible device according to various embodiments of the present disclosure.
Figure 19:
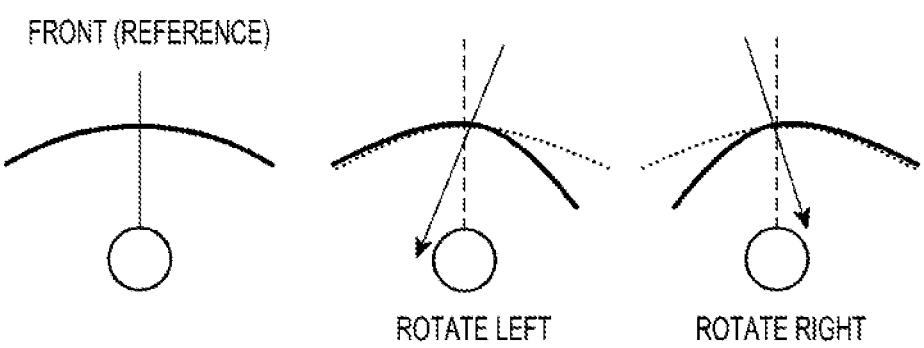

According to various embodiments of the present disclosure, in the street view mode shown in FIGS. 18 to 20, various functions may correspond to various operations interacting with the flexible device as shown in Table 1.

TABLE 1

| Street view function | Touch input | Bending input |
|---|---|---|
| View upward (90 degrees) | Vertical swipe - up | Bending lower part of device - rotate upward by up to 90 degrees based on bending angle (maximum of 90 degrees) |
| View downward (90 degrees) | Vertical swipe - down | Bending upper part of device - rotate downward by up to 90 degrees based on bending angle (maximum of 90 degrees) |
| View in the left direction (360 degrees) | Horizontal swipe - from left | Bending right side of device - rotate left up to 180 degrees based on bending angle (maximum of 180 degrees) |
| View in the right direction (360 degrees) | Horizontal swipe - from right | Bending left side of device - rotate right up to 90 degrees based on bending angle (maximum of 90 degrees) |
| Move forward | Tap arrow button | Slightly bend by threshold angle or more within N seconds and then bend out - move forward a specific distance<br>Hold bending by threshold angle or more - Continue moving forward (moving forward is stopped if bent out) |
| Move Backward | None (turn around the back by left-right view and then tap arrow) | Execute set function (slight bend out by threshold angle or more within N seconds and then bend) |
| Move to the left/the right | Tap arrow button | Slightly bend and then bend out - rotate left/right | embodiments of the present disclosure, the user bends the flexible device by applying force in a direction in the street view mode shown in FIG. 18, such that various functions may be provided. According to various embodiments of the present disclosure, various functions may be provided considering not only bending, but also bending direction, bending angle, bending duration, and a contact region touched by the user in the flexible device.

FIGS. 19 and 20 illustrate examples of operation implementation applied to street view in a flexible device according to various embodiments of the present disclosure. FIG. 19 shows an operation in the landscape mode, and FIG. 20 shows an operation in the portrait mode.

Figure 21:
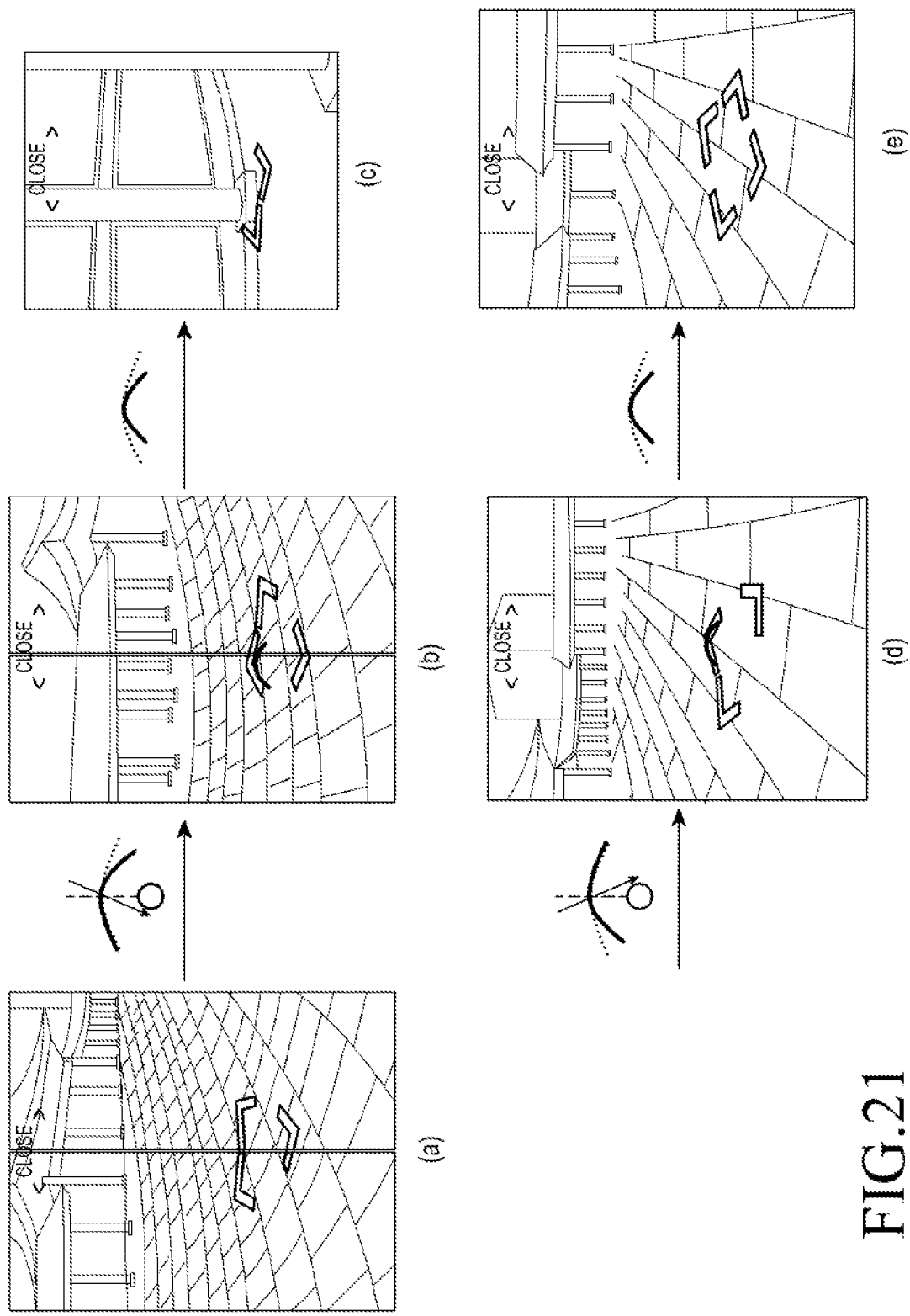
FIG. 21 illustrates an example of operation implementation applied to street view in a flexible device according to various embodiments of the present disclosure.

FIG. 21 illustrates an example of operation implementation applied to street view in a flexible device according to various embodiments of the present disclosure. Referring to FIG. 21, the map application is executed in the flexible device, and the street view screen may be displayed on the screen.

As shown in (a), when there are various moving directions or there is no closest direction to the center, a separate indicator may not be shown. When the user bends the flexible device forward while holding the flexible device, by further applying force on the right hand in a screen shown in (a), then the screen may move to the left like the screen shown in (b) so that the user's eyes may be on the right side.

When the user bends the flexible device forward while holding the flexible device, by further applying force on the left hand in the screen shown in (a), then the screen may move to the right like the screen shown in (d) so that the user's eyes may be on the left side.

According to various embodiments of the present disclosure, when the user bends the flexible device forward while holding the flexible device, by applying the same or similar force on both hands in the screen shown in (b) or (d), then the screen may move forward as in the screen shown in (c) or (e), respectively.

Figure 22:
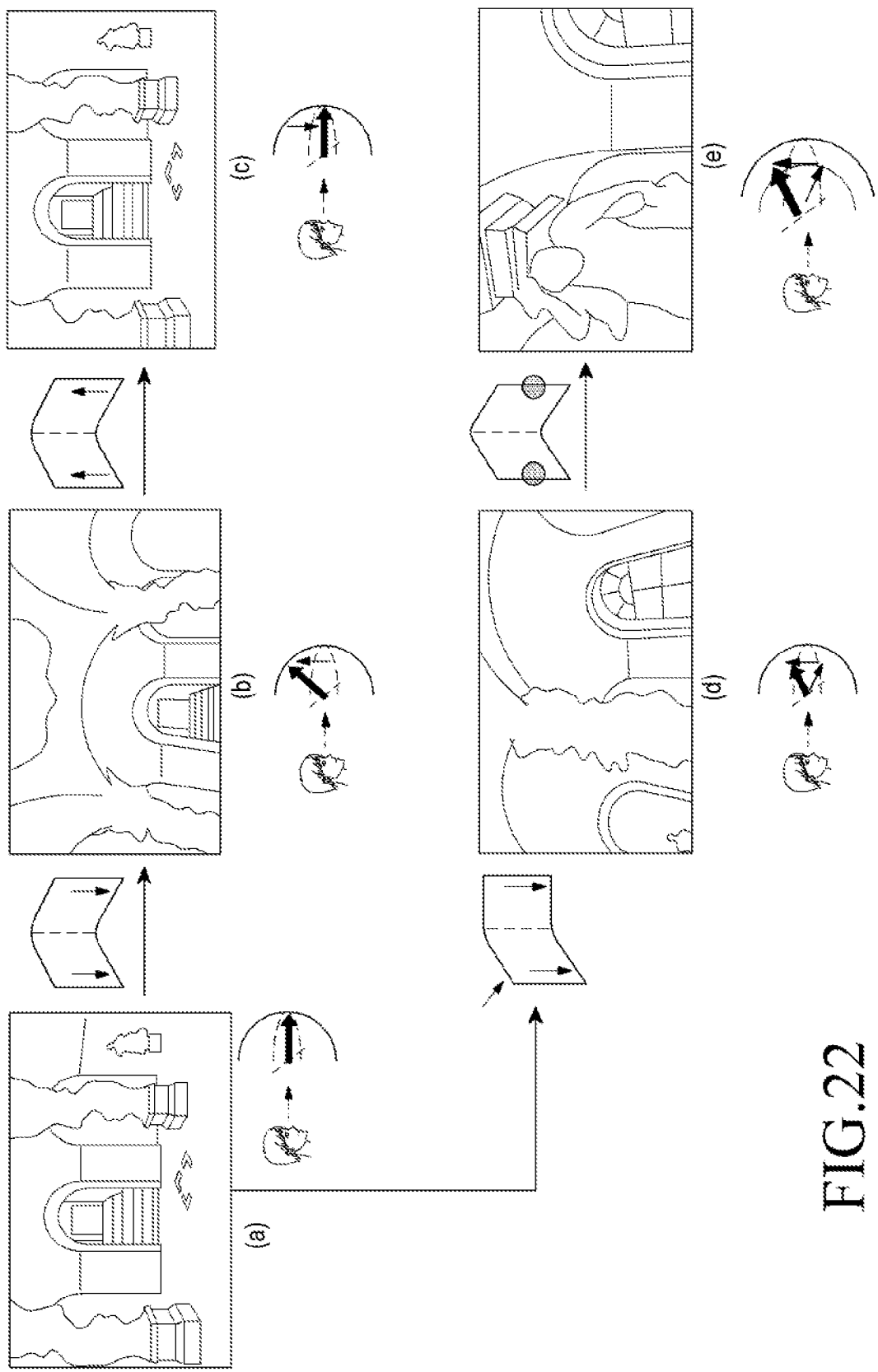
FIG. 22 illustrates an example of operation implementation applied to VR in a flexible device according to various embodiments of the present disclosure.

FIG. 22 illustrates an example of operation implementation applied to VR in a flexible device according to various embodiments of the present disclosure. Referring to FIG. 22, when the VR application is executed in the flexible device, the VR screen may be displayed on the screen. According to various embodiments of the present disclosure, when the user bends the flexible device forward while holding the flexible device with both hands, by applying the same or similar force on both hands, then a preset function may be executed. For example, when the user flicks down both hands while bending the flexible device forward in a screen shown in (a), the user's eyes may move up with respect to the center of the screen so that the screen as shown in (b) may be displayed. When the user flicks up both hands while bending the flexible device forward in the screen shown in (b), the user's eyes may move down with respect to the center of the screen so that the screen as shown in (c) may be displayed.

According to various embodiments of the present disclosure, when the user bends the flexible device while holding the flexible device with both hands, by applying the greater force on either hand, then a preset function may be executed. For example, when the user flicks down both hands while bending the flexible device forward by applying the greater force on the left hand holding the flexible device, the user's eyes may move to the left-upper side with respect to the center of the screen so that the screen as shown in (d) may be displayed. When the user bends the flexible device forward by applying the same or similar force on both hands holding the flexible device in the screen as shown in (d), then the screen is zoomed in so that the screen as shown in (e) may be displayed.

Figure 23:
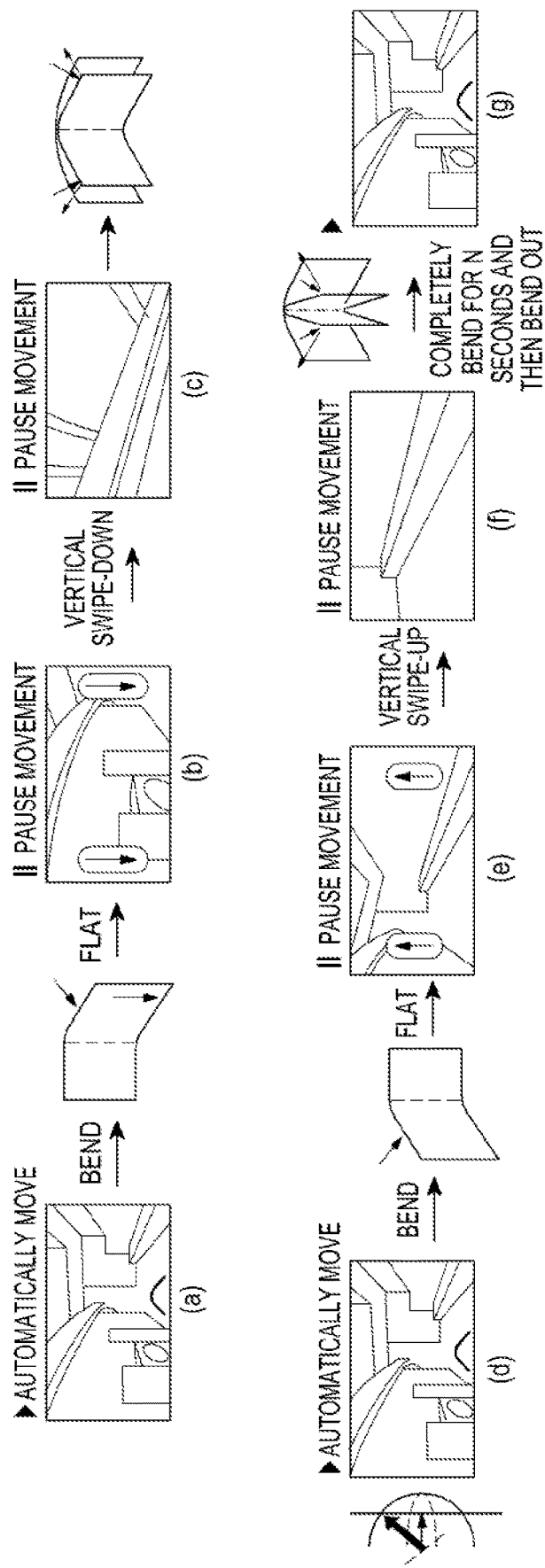
FIGS. 23 and 24 illustrate examples of operation implementation applied to 360-degree contents in a flexible device according to various embodiments of the present disclosure.
Figure 24:
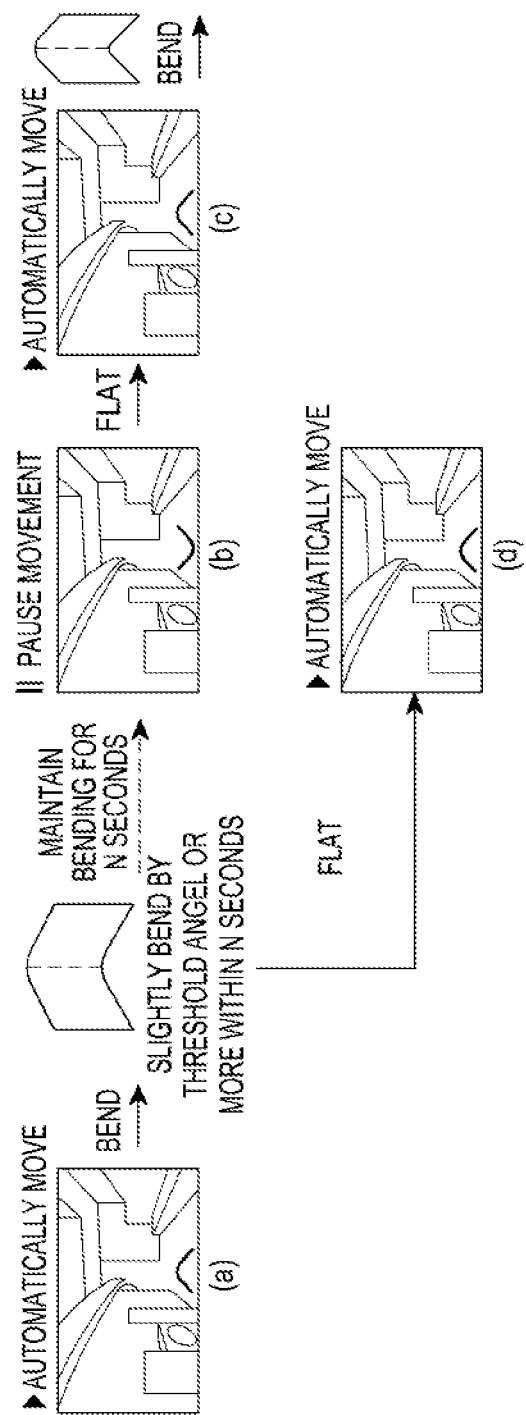

FIGS. 23 and 24 illustrate examples of operation implementation applied to 360-degree content in a flexible device according to various embodiments of the present disclosure. Referring to FIGS. 23 and 24, when a 360-degree content play application is executed in the flexible device, functions according to various embodiments of the present disclosure may be provided. When the user plays the 360-degree content of images captured previously in a 360-degree direction, then the user may view the screen in the 360-degree direction according to user's direction control while playing content. The 360-degree content may, when played, allow the user to navigate the screen as the user changes the direction. Once the 360-degree content is played, navigation may automatically start along a default route. For example, the content may be displayed as the viewpoint of the screen moves forward along the default route.

Referring to FIG. 23, 360-degree content may be played and a screen may be displayed as automatically moving along the default route as shown in a screen (a). According to various embodiments of the present disclosure, when the user bends the flexible device forward by further applying force on the right hand holding the flexible device, play of the content may be paused and a left-view function may be executed. According to various embodiments of the present disclosure, in the state where the play is paused, when the bends the flexible device forward by further applying force on the left hand holding the flexible device, a right-view function may be executed.

In the state where the play is paused as shown in a screen (b), when the user vertically swipes down, an up-view function may be executed according to a swipe direction as shown in a screen (c).

According to various embodiments of the present disclosure, when the flexible device is slightly bent by a threshold angle or more within N seconds as shown in screen (c), an auto-play function may be executed as shown in a screen (d). In screen (d), after the upward viewpoint of the user is automatically changed to forward/backward movement region, the screen may move forward.

According to various embodiments of the present disclosure, when the user bends the flexible device forward by further applying force on the left hand holding the flexible device in screen (d), play of the content may be paused and a right-view function may be executed as shown in a screen (e). According to various embodiments of the present disclosure, in the state where the play is paused, when the bends the flexible device forward by further applying force on the right hand holding the flexible device, a left-view function may be executed.

In the state where the play is paused as shown in screen (e), when the user vertically swipes up, a down-view function may be executed according to a swipe direction as shown in screen (f).

According to various embodiments of the present disclosure, when the flexible device is completely bent for N seconds or more in screen (f), navigation returns to the initial point as shown in a screen (g).

Referring to FIG. 24, 360-degree content may be played and a screen may be displayed as automatically moving along the default route as shown in a screen (a). According to various embodiments of the present disclosure, when the user slightly bends the flexible device for a threshold angle or more within preset N seconds by applying force on both hands holding the flexible device, and then maintains the bending state during N seconds, then play is paused stopped and a forward indication arrow may be changed to a backward indication arrow as shown in a screen (b), and a haptic feedback may also be provided together. According to various embodiments of the present disclosure, in the state where the play is paused, when the flexible device is bent out and thus becomes flat, then the content may be played to automatically move backward as shown in a screen (c). In the state where the content is played while moving backward, when bending the flexible device by the threshold angle or more is maintained, then the content may be played, continuing moving backward.

According to various embodiments of the present disclosure, when the flexible device is slightly bent by a threshold angle or more within N seconds as shown in screen (a), an auto-play function may be executed as shown in screen (d).

According to various embodiments of the present disclosure, for 360-degree content shown in FIGS. 23 and 24, various functions may correspond to various operations interacting with the flexible device as shown in Table 2.

TABLE 2

| 360-degree view function | Touch input | Bending input |
|---|---|---|
| View upward (90 degrees) | Vertical swipe - up | Bending by applying force to lower side of device - rotate left |
| View downward (90 degrees) | Vertical swipe - down | Bending by applying force to upper side of device - rotate right |
| View in the left direction (360 degrees) | Horizontal swipe - from left | Bending by applying force to the right - rotate left |
| View in the right direction (360 degrees) | Horizontal swipe - from right | Bending by applying force to the left - rotate right |
| Move forward | Tap arrow button | Hold bending by threshold angle or more - Continue moving forward (moving forward is stopped if bent out) |
| Move backward | Tap arrow button | Hold bending by threshold angle or more - Continue moving forward (moving forward is stopped if bent out) |
| Hold current viewing without changing viewing | Grip by touching both surfaces of device | Bend in particular direction and then bend out into flat state |
| Automatically change viewpoint of up/down direction to forward/backward-movement region and then move forward | | |
| Return to initial point of navigation | | Completely bend and then bend out after elapse of a specific time |

Operations for various content shown in FIGS. 15 to 24 may be as shown in Table 3, but various embodiments of the present disclosure are not limited thereto.

TABLE 3

| | Content type | 2D | 3D | 360-degree VR | VR | Remote view |
|---|---|---|---|---|---|---|
| Map | | 2D-view map | 3D-view map | — | Street-view map | — |
| image/picture | | 2D view image | — | 360-degree picture | — | — |
| VR | | 2D library preview | — | — | VR library view | — |
| Remote view | | — | — | — | — | Remote view (2D) |
| Interaction | Fold then Release/Bend then Release Interaction | Switch to 3D/360-degree/VR Zoom in/out | Switch to 360-degree/VR Move Forward/Backward with respect to Current Viewpoint | 1. No action 2. Switch to 2D Zoom in/out | 1. No action 2. Switch to 2D Move Forward/Backward with respect to Current Viewpoint (Move in Z axis) | 1. No action 2. Switch to 2D 1. Zoom in/out 2. Move Forward/Backward with respect to Current Viewpoint |
| | Fold & Hold/Bend & Hold (Center) | | | | | |
| | Interaction Fold & Hold/Bend & Hold (Left/Right or Up/Down) | Zoom in/out with respect to Folded/Bent Position | Move by Rotation with respect to Folded/Bent Position | Rotate with respect to Folded/Bent Position and Change Viewing Region | Move by Rotation with respect to Folded/Bent Position | 1. Rotate with respect to Folded/2. Bent Position and Change Viewing Region 2. Move by Rotation with respect to Folded/Bent Position |
| | Interaction Unfold/Flat | 1. No action 2. Switch to 2D | 1. No action 2. Switch to 2D | 1. No action 2. Switch to 2D | 1. No action 2. Switch to 2D | 1. No action 2. Switch to 2D |
| Additional Interaction | Tap, Tap & Hold Additional Interaction | No action No action | No action No action | No action No action | No action No action | No action No action |
| | Force touch Additional Interaction | N/A | 1. Move/Rotate 2. Move viewpoint in Corresponding Direction/Rotate | | | |
| | Flick Additional Interaction | No action | Zoom in/out | Zoom in/out | Zoom in/out | Zoom in/out |
| | 2 finger Pinch/Stretch Additional Interaction | | | | | |

Figure 25:
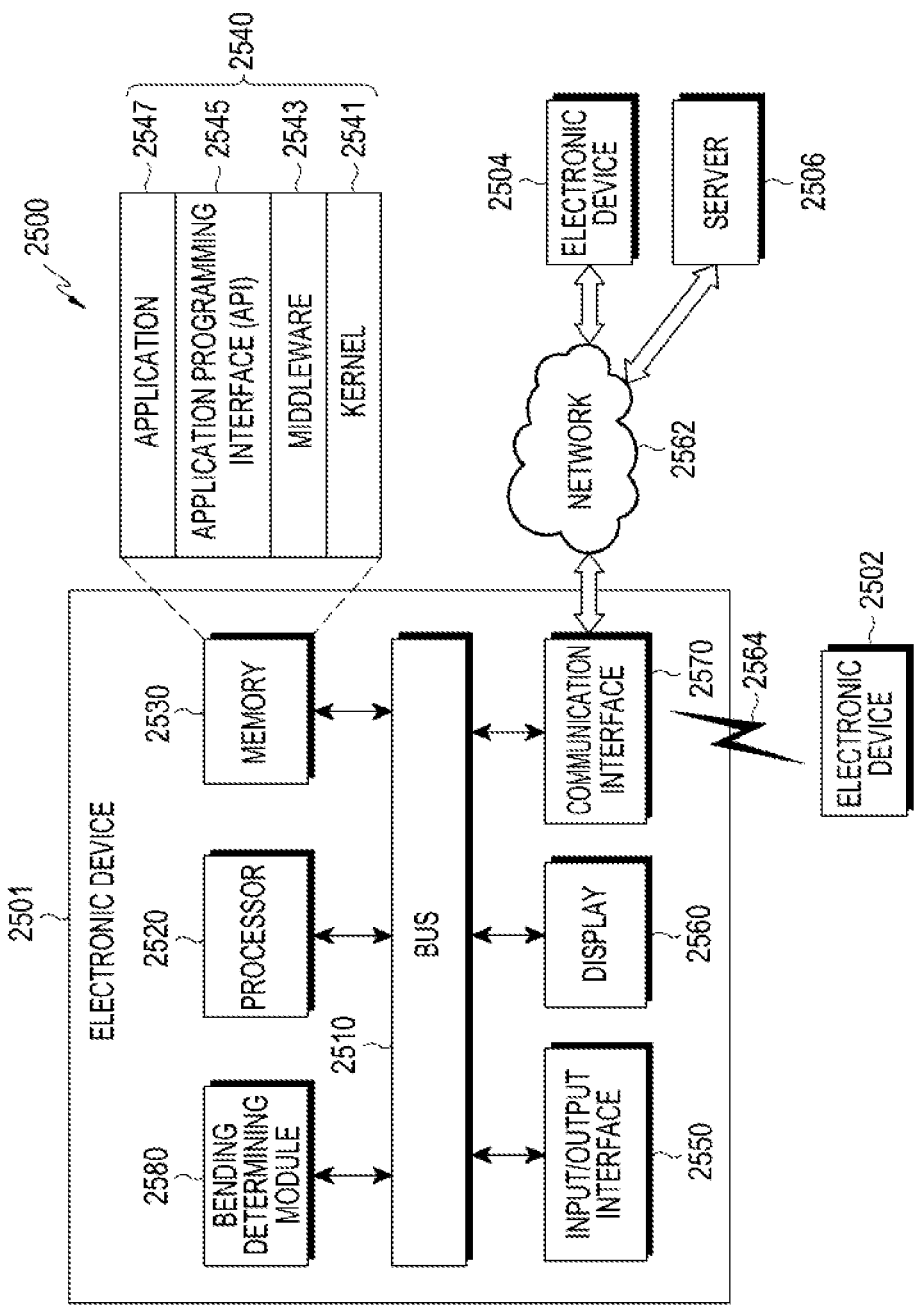
FIG. 25 illustrates a network environment according to an embodiment of the present disclosure.

FIG. 25 illustrates a network environment according to various embodiments of the present disclosure. Referring to FIG. 25, an electronic device 2501 in a network environment 2500 according to various embodiments of the present disclosure is disclosed. The electronic device 2501 may include the entire electronic device illustrated in FIG. 1 or a part of the electronic device illustrated in FIG. 2. The electronic device 2501 may include at least one of a bus 2510, a processor 2520, a memory 2530, an input/output (I/O) interface 2550, a display 2560, a communication interface 2570, or a bending determining module 2580. According to some embodiments, the electronic device 2501 may omit at least one of the foregoing elements or may further include other elements.

The bus 2510 may include a circuit for connecting, e.g., the elements 2510 to 2580 and delivering communication (e.g., a control message and/or data) between the elements 2510 to 2580.

The processor 2520 may include one or more of a central processing unit (CPU), an application processor (AP), and a communication processor (CP). The processor 2520 performs operations or data processing for control and/or communication of, for example, at least one other elements of the electronic device 2501.

The memory 2530 may include a volatile and/or nonvolatile memory. The memory 2530 may store, for example, commands or data associated with at least one other elements of the electronic device 2501. According to an embodiment of the present disclosure, the memory 2530 may store software and/or a program 2540. The program 2540 may include at least one of, for example, a kernel 2541, middleware 2543, an application programming interface (API) 2545, and/or an application program (or "application") 2547, and the like. At least a part of the kernel 2541, the middleware 2543, or the API 2545 may be referred to as an operating system (OS).

The kernel 2541 may control or manage, for example, system resources (e.g., the bus 2510, the processor 2520, the memory 2530, etc.) used to execute operations or functions implemented in other programs (e.g., the middleware 2543, the API 2545, or the application program 2547). The kernel 2541 provides an interface through which the middleware 2543, the API 2545, or the application program 2547 accesses separate components of the electronic device 2501 to control or manage the system resources.

The middleware 2543 may work as an intermediary for allowing, for example, the API 2545 or the application program 2547 to exchange data in communication with the kernel 2541. The middleware 2543 may perform control (e.g., scheduling or load balancing) with respect to task requests received from the application program 2547 by assigning a priority to at least one of the application program 2547, which makes it possible to use a system resource (e.g., the bus 2510, the processor 2520, the memory 2530, or the like) of the electronic device 2501.

The API 2545 is an interface used for the application 2547 to control a function provided by the kernel 2541 or the middleware 2543, and may include, for example, at least one interface or function (e.g., an instruction) for file control, window control, image processing, character control, or the like.

The I/O interface 2550 serves as an interface for delivering a command or data input from a user or another external device to other component(s) 11 through 17 of the electronic device 2501. The I/O interface 2550 may also output a command or data received from other component(s) 11 through 17 of the electronic device 2501 to a user or another external device.

The display 2560 may be a means for displaying a luminance or chrominance-adjusted screen according to various embodiments of the present disclosure, and may include, for example, a liquid crystal display (LCD), a light emitting diode (LED) display, an organic LED (OLED) display, a microelectromechanical system (MEMS) display, or an electronic paper display. The display 2560 may display, for example, various contents (e.g., a text, an image, video, an icon, a symbol, etc.) to the user. The display 2560 may include a touch screen, and receives a touch, a gesture, proximity, or a hovering input, for example, by using an electronic pen or a part of a body of a user.

The communication interface 2570 establishes communication between the electronic device 2501 and an external device (e.g., a first external electronic device 2502, a second external electronic device 2504, or a server 2506). For example, the communication interface 2570 may be connected to a network 2562 through wireless communication or wired communication to communicate with an external device (e.g., the second external electronic device 2504 or the server 2506). The communication interface 2570 may directly communicate with the external device (e.g., the first external electronic device 2502) through wireless communication or wired communication 2564. In the following embodiments, when the electronic device 2501 is a flexible device, the first external electronic device 2502 may be a wearable device. For example, according to various embodiments of the present disclosure, the flexible device and the wearable device may transmit and receive information related to bending to and from each other by communicating each other.

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of USB, a high definition multimedia interface (HDMI), recommended standard232 (RS-232), and a plain old telephone service (POTS). The network 2562 may include a telecommunications network, for example, at least one of a computer network (e.g., a local area network (LAN) or a wide area network (WAN)), Internet, and a telephone network.

Each of the first external electronic device 2502 and the second external electronic device 2504 may be a device of the same type as or a different type than the electronic device 2501. According to an embodiment, the server 2506 may include a group of one or more servers. According to various embodiments of the present disclosure, some or all of operations performed by the electronic device 2501 may be performed in another electronic device or a plurality of electronic devices (e.g., the electronic device 2502 or 2504, or the server 2506). According to an embodiment of the present disclosure, when the electronic device 2501 has to perform a function or a service automatically or at a request, the electronic device 2501 may request another device (e.g., the electronic devices 2502 or 2504 or the server 2506) to perform at least some functions associated with the function or the service instead of or in addition to executing the function or the service. The another electronic device (e.g., the electronic device 2502 or 2504 or the server 2506) may execute the requested function or additional function and deliver the execution result to the electronic device 2501. The electronic device 2501 may then process or further process the received result to provide the requested function or service. To that end, a cloud computing, distributed computing, or client-server computing technology may be used, for example.

Although the electronic device 2501 is illustrated as communicating with the external electronic device 2504 or the server 2506 through the network 2562 by including the communication interface 2570 in FIG. 25, the electronic device 2501 may also be implemented as operating independently in the electronic device 2501 without a separate communication function according to various embodiments of the present disclosure.

The bending determining module 2580 processes at least a part of information obtained from other elements (e.g., the processor 2520, the memory 2530, the I/O interface 2550, the communication interface 2570, and so forth) and provides the same to the user in various ways.

For example, the bending determining module 2580 may determine the bending information of the flexible device 2501 according to various embodiments of the present disclosure. The bending information may be determined from information sensed by at least one bending detecting sensor. The bending detecting sensor may be implemented in various forms, and may include, for example, at least one strain gauge.

According to various embodiments of the present disclosure, bending information determined by the bending determining module 2580 may include at least one selected from among bending or non-bending, bending angle, bending position, bending direction, bending speed, bending duration, bending strength, or the number of bends, but various embodiments of the present disclosure are not limited thereto. At least some functions of the bending determining module 2580 may be included in the processor 2520.

In FIG. 25, the bending determining module 2580 is illustrated as a module that is separate from the processor 2520, but at least a part of the bending determining module 2580 may be implemented as being included in the processor 2520 or at least one another module (e.g., a separate sensor or touch sensor), and all functions of the bending determining module 2580 may be implemented as being included in the processor 2520 or another processor.

Figure 26:
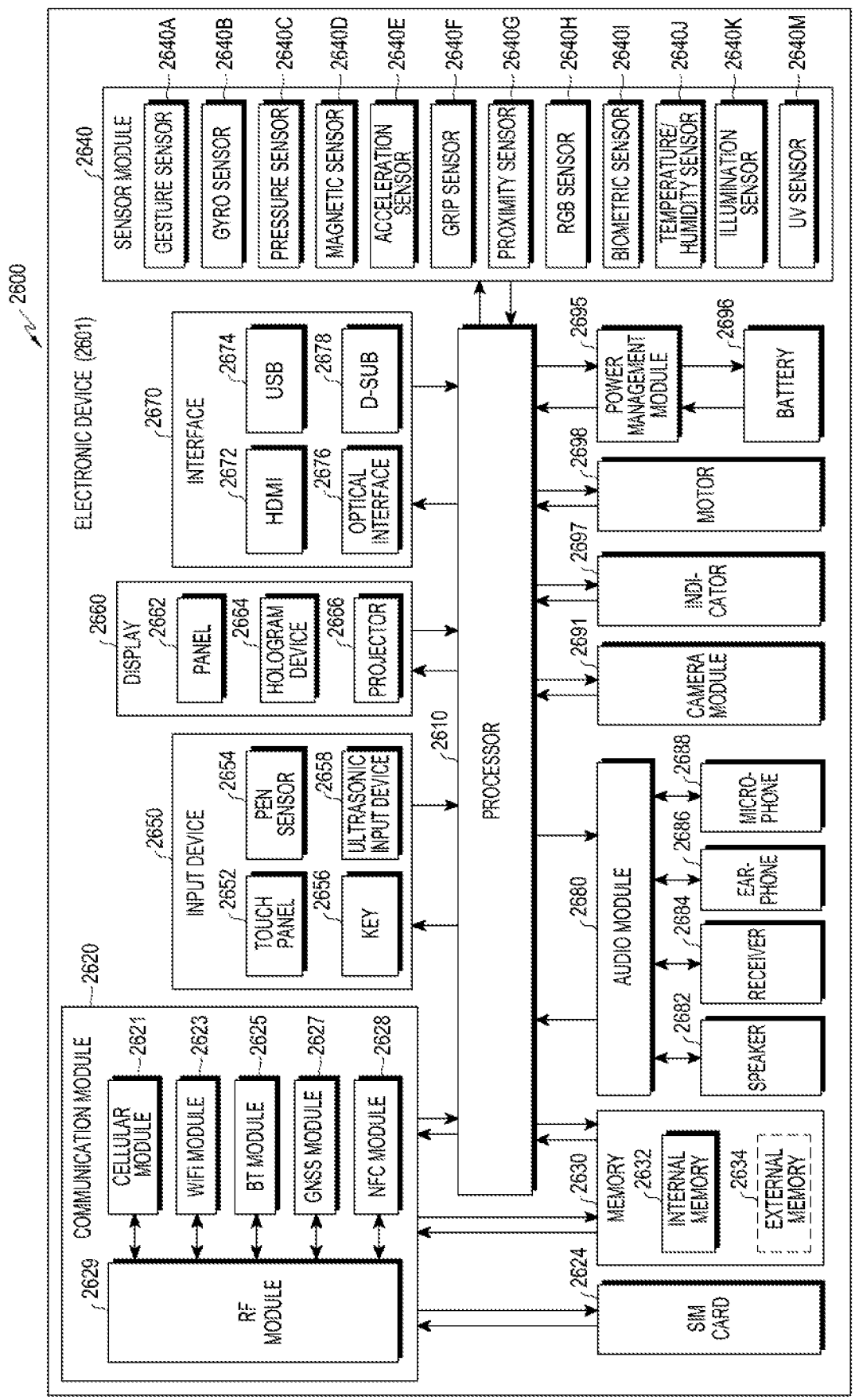
FIG. 26 is a block diagram of a detailed structure of an electronic device according to an embodiment of the present disclosure.

FIG. 26 is a block diagram 2600 of an electronic device 2601 according to various embodiments of the present disclosure. The electronic device 2601 may include the entire electronic device illustrated in FIG. 1 or FIG. 25 or a part thereof. The electronic device 2601 may include one or more application processors (APs) 2610, a communication module 2620, a subscriber identification module (SIM) card 2624, a memory 2630, a sensor module 2640, an input device 2650, a display 2660, an interface 2670, an audio module 2680, a camera module 2691, a power management module 2695, a battery 2696, an indicator 2697, and a motor 2698.

The AP 2610 controls multiple hardware or software components connected to the AP 2610 by driving an operating system (OS) or an application program, and performs processing and operations with respect to various data. The AP 2610 may be implemented with, for example, a system on chip (SoC). According to an embodiment, the server 2610 may further include a GPU and/or an image signal processor. The AP 2610 may include at least some of the elements illustrated in FIG. 19 (e.g., the cellular module 2621). The processor 2610 loads a command or data received from at least one of other elements (e.g., a non-volatile memory) into a volatile memory to process the command or data, and stores various data in the non-volatile memory.

The communication module 2620 may include, for example, the cellular module 2621, a WiFi module 2623, a Bluetooth (BT) module 2625, a GPS module 2627, a near field communication (NFC) module 2628, and a radio frequency (RF) module 2629.

The cellular module 2621 may provide, for example, a voice call, a video call, a text service, or an Internet service over a communication network. According to an embodiment, the cellular module 2621 identifies and authenticates the electronic device 2601 in a communication network by using the SIM (e.g., a SIM card) 2624. According to an embodiment, the cellular module 2621 performs at least some of functions that may be provided by the AP 2610. According to an embodiment, the cellular module 2621 may include a communication processor (CP).

Each of the WiFi module 2623, the BT module 2625, the GPS module 2627, and the NFC module 2628 may include a processor for processing data transmitted and received by a corresponding module. According to some embodiment, at least some (e.g., two or more) of the cellular module 2621, the WiFi module 2623, the BT module 2625, the GPS module 2627, and the NFC module 2628 may be included in one integrated chip (IC) or IC package.

The RF module 2629 may, for example, transmit and receive a communication signal (e.g., an RF signal). The RF module 2629 may include a transceiver, a power amp module (PAM), a frequency filter, a low noise amplifier (LNA), or an antenna. According to another embodiment, at least one of the cellular module 2621, the WiFi module 2623, the BT module 2625, the GPS module 2627, and the NFC module 2628 may transmit and receive an RF signal through the separate RF module 229.

The SIM card 2624 may include, for example, a card including a SIM and/or an embedded SIM, and may include unique identification information (e.g., an integrated circuit card identifier (ICCID) or subscriber information (e.g., an international mobile subscriber identity (IMSI)).

The memory 2630 (e.g., the memory 2530) may, for example, include an internal memory 2632 and/or an external memory 2634. The internal memory 2632 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid-state drive (SSD).

The external memory 2634 may further include flash drive, for example, compact flash (CF), secure digital (SD), micro-SD, mini-SD, extreme Digital (xD), a multi-media card (MMC), or a memory stick. The external memory 2634 may be functionally and/or physically connected with the electronic device 2601 through various interfaces.

The sensor module 2640 measures physical quantity or senses an operation state of the electronic device 2601 to convert the measured or sensed information into an electric signal. The sensor module 2640 may, for example, include at least one of a gesture sensor 2640A, a gyro sensor 2640B, a pressure sensor 2640C, a magnetic sensor 2640D, an accelerometer 2640E, a grip sensor 2640F, a proximity sensor 2640G, a color sensor (e.g., RGB sensor) 2640H, a biometric sensor 26401, a temperature/humidity sensor 2640J, an illumination sensor 2640K, and a ultraviolet (UV)

sensor 2640M. Additionally or alternatively, the sensor module 2640 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 2640 may further include a control circuit for controlling at least one sensor included therein. In some embodiment, the electronic device 2601 may further include a processor configured to control the sensor module 2640 as part of or separately from the AP 2610, to control the sensor module 2640 during a sleep state of the AP 2610.

The input device 2650 may include, for example, a touch panel 2652, a (digital) pen sensor 2654, a key 2656, or an ultrasonic input device 2658. The touch panel 2652 may use at least one of a capacitive type, a resistive type, an IR type, or an ultrasonic type. The touch panel 2652 may further include a control circuit. The touch panel 2652 may further include a tactile layer to provide tactile reaction to the user.

The (digital) pen sensor 2654 may include a recognition sheet which is a part of the touch panel or a separate recognition sheet. The key 2656 may also include a physical button, an optical key, or a keypad. The ultrasonic input device 2658 senses sound waves through a microphone (e.g., the microphone 2688) of the electronic device 2601 using an input means that generates an ultrasonic signal, thereby checking data.

The display 2660) may include a panel 2662, a hologram device 2664, or a projector 2666. The panel 2662 may be implemented to be flexible, transparent, or wearable. The panel 2662 may be configured with the touch panel 2652 in one module. The hologram device 2664 shows a stereoscopic image in the air by using interference of light. The projector 2666 displays an image through projection of light onto a screen. The screen may be positioned inside or outside the electronic device 2601. According to an embodiment, the display 2660 may further include a control circuit for controlling the panel 2662, the hologram device 2664, or the projector 2666.

According to an embodiment, the interface 2670 may include an HDMI 2672, a USB 2674, an optical interface 2676, or a D-subminiature (D-sub) 2678. Additionally or alternatively, the interface 2670 may include, for example, a mobile high-definition link (MHL) interface, an SD card/MMC interface, or an Infrared Data Association (IrDA) standard interface.

The audio module 2680 bi-directionally converts sound and an electric signal. The audio module 2680 processes sound information input or output through the speaker 2682, the receiver 2684, the earphone 2686, or the microphone 2688.

The camera module 2691 is, for example, a device capable of capturing a still image or a moving image, and according to an embodiment, may include one or more image sensors (e.g., a front sensor or a rear sensor), a lens, an image signal processor (ISP), or a flash (e.g., an LED or a xenon lamp).

The power management module 2695 manages power of the electronic device 2601. According to an embodiment, the power management module 2695 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 2696 or the voltage, current, or temperature of the battery 1696 during charging. The battery 2696 may include a rechargeable battery or a solar battery.

The indicator 2697 displays a particular state, for example, a booting state, a message state, or a charging state, of the electronic device 2601 or a part thereof (e.g., the AP 2610). The motor 2698 converts an electric signal into mechanical vibration or generates vibration or a haptic effect. Although not shown, the electronic device 2601 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements of the electronic device may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

Figure 27:
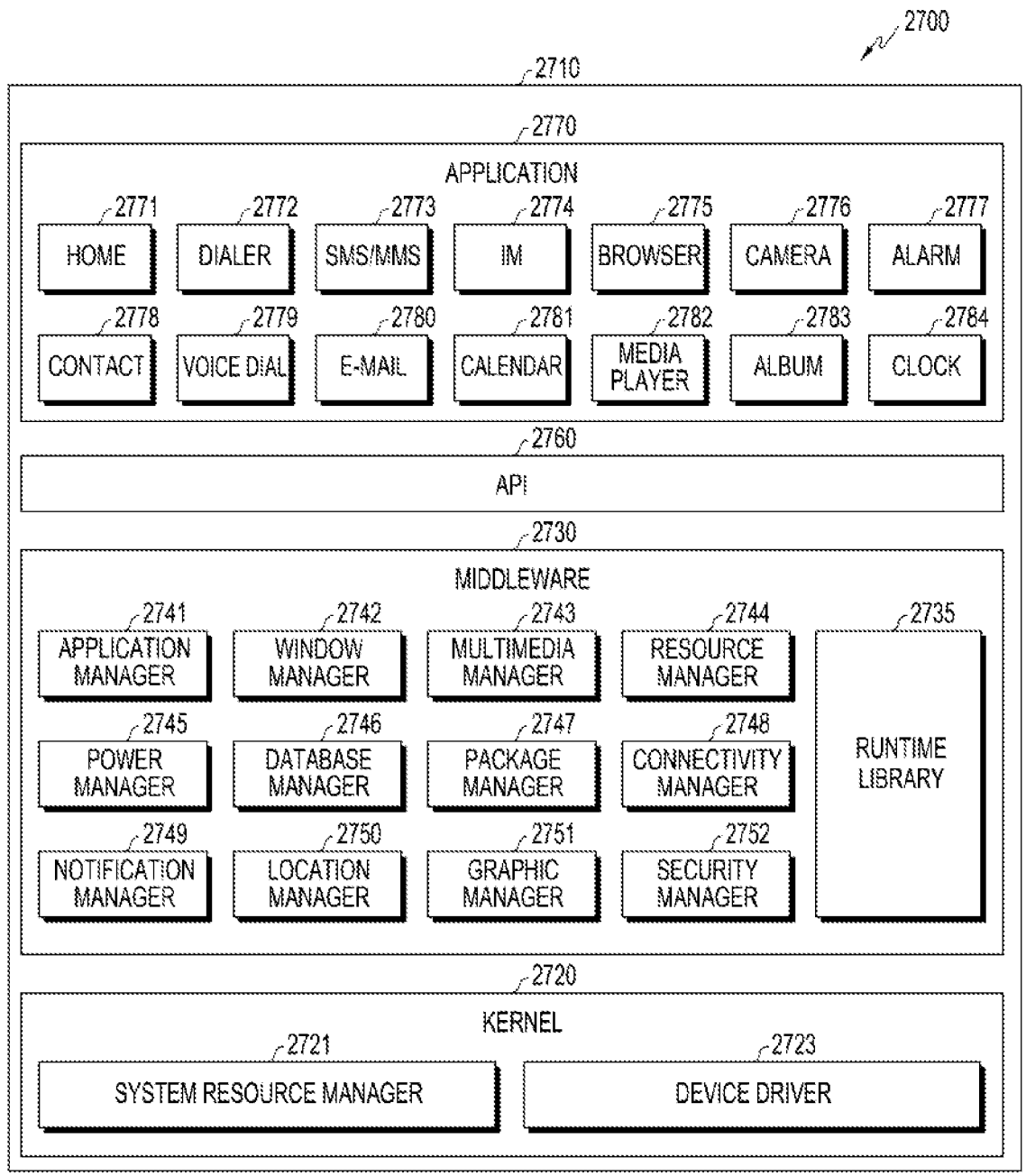
FIG. 27 is a block diagram of a programming module according to various embodiments of the present disclosure.

FIG. 27 is a block diagram 2700 of a programming module 2710 according to various embodiments of the present disclosure. According to an embodiment, the programming module 2710 may include an OS for controlling resources associated with an electronic device (e.g., the electronic device) and/or various applications (e.g., an application program) executed on the OS. The OS may include, for example, Android™, iOS™, Windows™, Symbian™, Tizen™, Bada™ or the like.

The programming module 2710 may include, for example, a kernel 2720, middleware 2730, an API 2760, and/or an application 2770. At least a part of the programming module 2710 may be preloaded on an electronic device or may be downloaded from a server.

The kernel 2720 may include a system resource manager 2721 or a device driver 2723. The system resource manager 2721 may perform control, allocation, retrieval of system resources, and so forth. According to an embodiment, the system resource manager 2721 may include a process management unit, a memory management unit, a file system management unit, or the like. The device driver 2723 may include, for example, a display driver, a camera driver, a Bluetooth driver, a shared memory driver, a USB driver, a keypad driver, a WiFi driver, an audio driver, or an interprocess communication (IPC) driver.

The middleware 2730 may provide functions that the application 2770 commonly requires or provide various functions to the application 2770 through the API 2760 to allow the application 2770 to efficiently use a limited system resource in the electronic device. According to an embodiment, the middleware 2730 may include at least one of a runtime library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, and a security manager 2752.

The runtime library 2735 may include a library module that a compiler uses to add a new function through a programming language while the application 2770 is executed. The runtime library 2735 performs functions relating to input/output management, memory management, or an arithmetic function.

The application manager 2741 may manage a life cycle of at least one application among the applications 2770. The window manager 2742 manages a GUI resource used in a screen. The multimedia manager 2743 recognizes a format necessary for playing various media files and performs encoding or decoding on a media file by using a codec appropriate for a corresponding format. The resource manager 2744 manages a resource such as a source code, a memory, or a storage space of at least one application among the applications 2770.

The power manager 2745 manages a battery or power, for example, in operation with a basic input/output system (BIOS) and provides power information necessary for an operation of the electronic device. The database manager 2746 generates, searches or changes a database used for at least one application among the applications 2770. The package manager 2747 manages the installation or update of an application distributed in a package file format.

The connectivity manager 2748 manages a wireless connection such as a WiFi or Bluetooth connection. The notification manager 2749 displays or notifies events such as arrival messages, appointments, and proximity alerts in a manner that is not disruptive to a user. The location manager 2750 manages location information of the electronic device. The graphic manager 2751 manages a graphic effect to be provided to the user or a user interface relating thereto. The security manager 2752 provides a general security function necessary for system security, user authentication, etc. According to an embodiment, if the electronic device (e.g., the electronic device of FIG. 8) has a call function, the middleware 2730 may further include a telephony manager for managing a voice or video call function of the electronic device.

The middleware 2730 may include a middleware module forming a combination of various functions of the above-mentioned elements. The middleware 2730 may provide modules specified according to types of an OS so as to provide distinctive functions. Additionally, the middleware 2730 may delete some of existing elements or add new elements dynamically.

The API 2760 may be provided as a set of API programming functions with a different configuration according to the OS. For example, in the case of Android or iOS, for example, one API set may be provided by each platform, and in the case of Tizen, two or more API sets may be provided.

The application 2770 may include one or more applications capable of providing a function, for example, a home application 2771, a dialer application 2772, a short messaging service/multimedia messaging service (SMS/MMS) application 2773, an instant message (IM) application 2774, a browser application 2775, a camera application 2776, an alarm application 2777, a contact application 2778, a voice dial application 2779, an e-mail application 2780, a calendar application 2781, a media player application 2782, an album application 2783, a clock application 2784, a health care application (e.g., an application for measuring an exercise amount, a blood sugar, etc.), or an environment information providing application (e.g., an application for providing air pressure, humidity, temperature information, etc.).

According to an embodiment, the application 2770 may include an application (hereinafter, an "information exchange application" for convenience) supporting information exchange between the electronic device (e.g., the electronic device of FIG. 1, 25, or 8) and an external electronic device. The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device. The notification relay application may receive notification information from an external electronic device to provide the same to a user. The device management application may manage (e.g., install, remove, or update) at least one function (e.g., turn on/turn off of an external electronic device itself (or a part thereof) or control of brightness (or resolution) of a display) of an external device communicating with the electronic device, a service (e.g., a call service or a message service) provided by an application operating on the external electronic device or provided by the external electronic device.

According to an embodiment, the application 2770 may include an application (e.g., a health care application) set on the basis of an attribute (e.g., a mobile medical appliance as a type of the electronic device) of the external electronic device. According to an embodiment, the application 2770 may include an application received from the external electronic device. According to an embodiment, the application 2770 may include a preloaded application or a third-party application that may be downloaded from the server. Names of elements of the programming module 2710 according to the illustrated embodiment may vary depending on a type of an OS.

According to various embodiments, at least a part of the programming module 2710 may be implemented by software, firmware, hardware, or a combination of at least two of them. The at least a part of the programming module 2710 may be implemented (e.g., executed) by a processor (e.g., the processor 3310). The at least a part of the programming module 2710 may include, for example, modules, programs, routines, sets of instructions, or processes for performing one or more functions.

A term "module" or "functional unit" used herein may mean, for example, a unit including one of or a combination of two or more of hardware, software, and firmware. The "module" or "functional unit" may be interchangeably used with a unit, a logic, a logical block, a component, or a circuit. The "module" or "functional unit" may be a minimum unit or a portion of an integrated component. The "module" may be a minimum unit or part thereof, adapted to perform one or more functions. The "module" or "functional unit" may be implemented mechanically or electronically. For example, the "module" or "functional unit" may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor 110 or 2520), the one or more processors may perform functions corresponding to the instructions. The computer-readable storage medium may be, for example, a memory included in the memory 2530.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments, a storage medium has stored therein instructions that, when executed by at least one processor, cause the at least one processor to perform at least one operation including, in a method for operating a flexible device, determining bending information of the flexible device, sensing contact with respect to at least a part of the flexible device, determining attributes of each of at least one contact region corresponding to the sensed contact, and controlling a function of the flexible device based on the determined bending information and a change of attributes of the at least one contact region.

The embodiments disclosed in the present specification and drawings have been provided to easily describe the present disclosure and to help understanding of the present disclosure, and are not intended to limit the scope of the present disclosure. Therefore, it should be construed that the scope of various embodiments of the present disclosure includes any change or other various embodiments based on the technical spirit of the present disclosure as well as the embodiments described herein.

The invention claimed is:

1. A flexible device comprising:
 a touch panel;
 at least one bending detection sensor; and
 a processor operable connected to the touch panel and the at least one bending detection sensor, the processor configured to:
 determine bending information of the flexible device obtained through the at least one bending detection sensor of the flexible device,
 determine attributes of each of at least two contact regions sensed through the touch panel, wherein the at least two contact regions include a first contact region and a second contact region,
 determine a bending direction based on the bending information and at least one change of the attributes of each of the at least one contact region, wherein, while the bending information is obtained through the at least one bending detection sensor, the at least one change of the attributes comprises a shape change of a first shape of the first contact region and a second shape of the second contact region; and
 perform a function of the flexible device based on the determined bending information and the bending direction.

2. The flexible device of claim 1, further comprising a display operably connected to the processor, wherein the display is configured to display a screen based on the determined bending information and the determined bending direction.

3. The flexible device of claim 1, wherein the bending information further comprises at least one of a bending or non-bending status, a bending angle, a bending position, a bending speed, a bending duration, a bending strength, or a number of bends.

4. The flexible device of claim 1, wherein the processor is further configured to:
 determine a type of bending interaction based on the determined bending information of the flexible device, and
 perform the function of the flexible device at least based on the determined type of the bending interaction.

5. The flexible device of claim 4, wherein the type of the bending interaction comprises at least one of bending by a pressure in one direction, bending by a pressure in two directions, bending for a specific time and then releasing, maintaining a bending state, or returning to a bending-out state.

6. The flexible device of claim 1, wherein the function of the flexible device comprises a function that is set in an application being currently executed.

7. The flexible device of claim 6, wherein the application comprises at least one of a map application, a two-dimensional (2D) contents play application, a three-dimensional (3D) contents play application, a 360-degree contents play application, or a virtual reality (VR) application.

8. The flexible device of claim 7, wherein the function of the flexible device comprises at least one of a mode switch function, a zoom-in/zoom-out function, a movement in one direction, a panning function, a rotation function, or a viewpoint switch function.

9. A method for operating a flexible device, the method comprising:
 determining bending information of the flexible device obtained through at least one bending detecting sensor of the flexible device;
 sensing, through a touch panel, a contact with respect to at least a part of the flexible device;
 determining attributes of each of at least two contact regions corresponding to the sensed contact, wherein the at least ee two contact regions include a first contact region and a second contact region;
 determining a bending direction based on the bending information and at least one change of the attributes of each of the at least one contact region, wherein, while the bending information is obtained through the at least one bending detection sensor, the at least one change of the attributes comprises a shape change of a first shape of the first contact region and a second shape of the second contact region; and
 performing a function of the flexible device based on the determined bending information and the bending direction.

10. The method of claim 9, further comprising displaying a screen based on the determined bending information and the determined bending direction.

11. The method of claim 9, wherein the bending information further comprises at least one of a bending or non-bending status, a bending angle, a bending position, a bending speed, a bending duration, a bending strength, or a number of bends.

12. The flexible device of claim 1, wherein the at least one change of the attributes further comprises at least one of a pressure change between a first pressure of the first contact region and a second pressure of the second contact region, an area change between a first area of the first contact region and a second area of the second contact region, or a moving trajectory between a first moving trajectory of the first contact region and a second moving trajectory of the second contact region.

13. The method of claim 9, wherein the at least one change of the attributes further comprises at least one of a pressure change between a first pressure of the first contact region and a second pressure of the second contact region, an area change between a first area of the first contact region and a second area of the second contact region, or a moving trajectory between a first moving trajectory of the first contact region and a second moving trajectory of the second contact region.

\* \* \* \* \*